US011472474B2

(12) United States Patent
Araki et al.

(10) Patent No.: US 11,472,474 B2
(45) Date of Patent: Oct. 18, 2022

(54) VEHICLE

(71) Applicant: AISIN CORPORATION, Kariya (JP)

(72) Inventors: Keizo Araki, Tokyo (JP); Akira Mizuno, Tokyo (JP); Shota Kubo, Tokyo (JP)

(73) Assignee: AISIN CORPORATION, Kariya (JP)

( * ) Notice: Subject to any disclaimer, the term of this patent is extended or adjusted under 35 U.S.C. 154(b) by 389 days.

(21) Appl. No.: 16/615,056

(22) PCT Filed: May 21, 2018

(86) PCT No.: PCT/JP2018/019500
§ 371 (c)(1),
(2) Date: Nov. 19, 2019

(87) PCT Pub. No.: WO2018/212360
PCT Pub. Date: Nov. 22, 2018

(65) Prior Publication Data
US 2020/0108861 A1 Apr. 9, 2020

(30) Foreign Application Priority Data

May 19, 2017 (JP) .............................. JP2017-100275

(51) Int. Cl.
B62D 5/06 (2006.01)
B60G 21/05 (2006.01)
(Continued)

(52) U.S. Cl.
CPC .............. B62D 5/06 (2013.01); B60G 21/05 (2013.01); B62D 1/04 (2013.01); B62D 7/16 (2013.01);
(Continued)

(58) Field of Classification Search
CPC ...... B62D 5/06; B60G 21/05; B60G 2300/45; B62K 5/05; B62K 5/027; B62K 5/10; G01P 3/44; G01P 15/165
(Continued)

(56) References Cited

U.S. PATENT DOCUMENTS 10,207,762 B2 *  2/2019  Takenaka ............. B60G 17/018
10,875,597 B2 * 12/2020  Mizuno .................... B62K 5/10
(Continued)

FOREIGN PATENT DOCUMENTS

CN       101203414 A     6/2008
CN       102712232 A    10/2012
(Continued)

OTHER PUBLICATIONS

Jun. 24, 2020 Office Action issued in Chinese Patent Application No. 201880032875.6.
(Continued)

Primary Examiner — James A English
Assistant Examiner — Caitlin Anne Miller
(74) Attorney, Agent, or Firm — Oliff PLC

(57) ABSTRACT

A vehicle small in width and capable of ensuring both driving stability and drivability includes: a vehicle body with two or more wheels including steered wheels (right front wheel, left front wheel) for steering; an inclination angle detection part that detects the inclination angle of the vehicle body about a roll axis thereof; and a torque applying part (turning mechanism) that applies a steering torque to the steered wheels in accordance with an inclination angular velocity or an inclination angular acceleration of the vehicle body calculated from the inclination angle.

11 Claims, 21 Drawing Sheets

(51) Int. Cl.
*B62D 1/04* (2006.01)
*B62D 7/16* (2006.01)
*G01C 9/02* (2006.01)
*G01P 3/44* (2006.01)
*G01P 15/16* (2013.01)
*G01P 15/14* (2013.01)

(52) U.S. Cl.
CPC ............. *G01C 9/02* (2013.01); *G01P 3/44* (2013.01); *G01P 15/14* (2013.01); *G01P 15/165* (2013.01)

(58) Field of Classification Search
USPC ........................................... 180/422
See application file for complete search history.

(56) References Cited

U.S. PATENT DOCUMENTS

| 2006/0212200 | A1 | 9/2006 | Yanai et al. | |
|---|---|---|---|---|
| 2008/0238005 | A1* | 10/2008 | James | B62D 9/02 280/5.509 |
| 2012/0221228 | A1* | 8/2012 | Noumura | B60W 30/02 701/1 |
| 2014/0312580 | A1 | 10/2014 | Gale | |
| 2015/0057888 | A1 | 2/2015 | Haas et al. | |
| 2020/0017158 | A1 | 1/2020 | Hara et al. | |
| 2022/0001715 | A1* | 1/2022 | Murata | B60G 17/0163 |

FOREIGN PATENT DOCUMENTS

| DE | 10 2012 205 520 A1 | 10/2013 |
|---|---|---|
| EP | 3 581 478 A1 | 12/2019 |
| JP | 2009-083578 A | 4/2009 |
| JP | 2011-073624 A | 4/2011 |
| JP | 2012-166637 A | 9/2012 |
| JP | 2013-112238 A | 6/2013 |
| JP | 2013-208974 A | 10/2013 |
| JP | 2014-524864 A | 9/2014 |
| JP | 2016-185746 A | 10/2016 |
| WO | 2005/075278 A1 | 8/2005 |
| WO | 2017/090666 A1 | 6/2017 |

OTHER PUBLICATIONS

Jul. 31, 2018 Search Report issued in International Patent Application No. PCT/JP2018/019500.
Feb. 4, 2021 Extended Search Report issued in European Patent Application No. 18802317.0.
Jul. 6, 2022 Office Action issued in Japanese Patent Application No. 2019-518908.

* cited by examiner (A)

(B)

(A)

(B)

(A)

(B)

(A)

(B)

(A)

(B)

(A)

(B)

(A)

(B)

(A)

(B)

(A)

(B)

Forward direction
(vehicle travel direction)

| Control pattern | $\frac{d\theta}{dt}$ : Low (Threshold value) | $\frac{d\theta}{dt}$ : High |
|---|---|---|
| Pattern (I) | Same direction | Opposite direction |
| Pattern (II) | Opposite direction | Same direction |

(A)

| Control pattern | $\frac{d^2\theta}{dt^2}$ : Low (Threshold value) | $\frac{d^2\theta}{dt^2}$ : High |
|---|---|---|
| Pattern (III) | Same direction | Opposite direction |
| Pattern (IV) | Opposite direction | Same direction |

(B)

(A)  (B)

VEHICLE

TECHNICAL FIELD

The present invention relates to a vehicle having a vehicle body provided with two or more wheels including a steered wheel.

BACKGROUND ART

In recent years, in view of exhaustion of energy resources, reduction of fuel consumption of vehicles has been strongly demanded. On the other hand, due to reduction in vehicle prices and the like, vehicle owners have increased to such an extent that there is a trend that each person owns one vehicle. Therefore, there has been a problem in that a 4-passenger vehicle is occupied by only one person, namely a driver, which is a waste of energy. The most efficient way of reducing the fuel consumption of a vehicle through a reduction of the size thereof is to configure the vehicle as a three-wheel or four-wheel single seater.

However, depending on the driving state, the stability of a vehicle may be deteriorated. In order to overcome this, there has been proposed a technique of inclining (leaning) the body of a vehicle in a lateral direction to thereby improve the stability of the vehicle at the time of turning.

Patent Document 1 (Jpn. PCT National Publication No. 2014-524864) discloses a three-wheeled vehicle 100 having a front wheel 106 inclined at substantially the same angle as a chassis 102 as the vehicle 100 is turning.

Patent Document 1

Jpn. PCT National Publication No. 2014-524864

DISCLOSURE OF THE INVENTION

Problems to be Solved by the Invention

In Patent Document 1, the vehicle is configured to turn in a mode in which the vehicle body is leaned and the steering angle of a steered wheel changes following the lean of the vehicle body. In this case, however, the steering angle of the steered wheel may be delayed in following the lean of the vehicle body, resulting in deterioration in turning responsiveness. Hereinafter, this problem is referred to as "problem 1".

On the other hand, when the lean speed of the vehicle body is very high, inertial force according to the angular velocity of the inclination angle of the vehicle body acts on a driver, which may interfere with driver's driving operation. Hereinafter, this problem is referred to as "problem 2".

Means for Solving the Problems

To solve the above problems, a vehicle according to the present invention includes: a vehicle body provided with two or more wheels including a steered wheel for steering; an inclination angle detection part that detects an inclination angle of the vehicle body about a roll axis thereof; and a torque applying part that applies a steering torque to the steered wheel in accordance with an inclination angular velocity or an inclination angular acceleration of the vehicle body calculated from the inclination angle.

In the vehicle according to the present invention, the torque applying part adjusts a steering angle direction of the steered wheel and/or a steering operation speed in accordance with the inclination angular velocity of the vehicle body.

In the vehicle according to the present invention, the torque applying part applies a steering torque in the same direction as the direction of the inclination angular velocity of the vehicle body.

In the vehicle according to the present invention, the torque applying part applies a steering torque in the same direction as the direction of the inclination angular velocity when the inclination angular velocity of the vehicle body is lower than a predetermined value and applies a steering torque in the direction opposite to the direction of the inclination angular velocity when the inclination angular velocity of the vehicle body is equal to or higher than the predetermined value.

In the vehicle according to the present invention, the torque applying part includes an elastic member that expands/contracts in accordance with inclination of the vehicle body.

In the vehicle according to the present invention, the inclination angle detection part is a first elastic member that expands/contracts in accordance with the inclination angle of the vehicle body, and the torque applying part has a second elastic member that operates in conjunction with the first elastic member to apply a steering torque to the steered wheel.

In the vehicle according to the present invention, the first and second elastic members are the same members.

The vehicle according to the present invention includes: a pair of suspension poles that house a pair of suspension arms that suspend a pair of steered wheels; a pair of horizontal links that form a parallel link together with the pair of suspension poles; and a tie rod that equalizes the steering angles of the pair of steered wheels. The torque applying part includes a damper having one end connected to the tie rod through a damper link and the other end connected to the vehicle body.

The vehicle according to the present invention includes: a pair of suspension poles that house a pair of suspension arms that suspend a pair of steered wheels; a pair of horizontal links that form a parallel link together with the pair of suspension poles; and a tie rod that equalizes the steering angles of the pair of steered wheels. The torque applying part includes: a first damper having one end connected to the tie rod through a damper link and the other end connected to the vehicle body; a second damper having one end connected to the horizontal link and the other end connected to the vehicle body; and a pair of circulation tubes that circulate fluid in the first damper and fluid in the second damper.

In the vehicle according to the present invention, characteristics of a resistance generated in accordance with a piston moving speed of the first damper and characteristics of a resistance generated in accordance with a piston moving speed of the second damper differ from each other.

In the vehicle according to the present invention, an input member that inputs a turning direction and a steering member that steers the steered wheel are mechanically semi-connected.

In the vehicle according to the present invention, an input member that inputs a turning direction and a steering member that steers the steered wheel are mechanically completely separated from each other.

The vehicle according to the present invention includes a control part that issues a control command to the torque applying part. The control part issues a control command to the torque applying part so as to adjust a steering angle direction of the steered wheel and/or a steering operation speed in accordance with the inclination angular velocity of the vehicle body.

In the vehicle according to the present invention, the torque applying part performs the adjustment when an actual inclination angle is far from a target inclination angle and does not perform the adjustment or reduce the adjustment when the actual inclination angle is close to the target inclination angle.

Advantageous Effects of the Invention

The vehicle according to the present invention has the torque applying part that applies a steering torque to the steered wheels in accordance with the inclination angular velocity or inclination angular acceleration of the vehicle body. According to the thus configured vehicle of the present invention, it is possible to solve one or both of the problems that the steered wheel may be delayed in following the lean of the vehicle body to deteriorate turning responsiveness and that inertial force according to the angular velocity of the inclination angle of the vehicle body acts on a driver to interfere with driver's driving operation.

BRIEF DESCRIPTION OF THE DRAWINGS

FIG. 21 is a view explaining the outline of control patterns of the vehicle 1 according to the present invention;

BEST MODE FOR CARRYING OUT THE INVENTION

Figure 1:
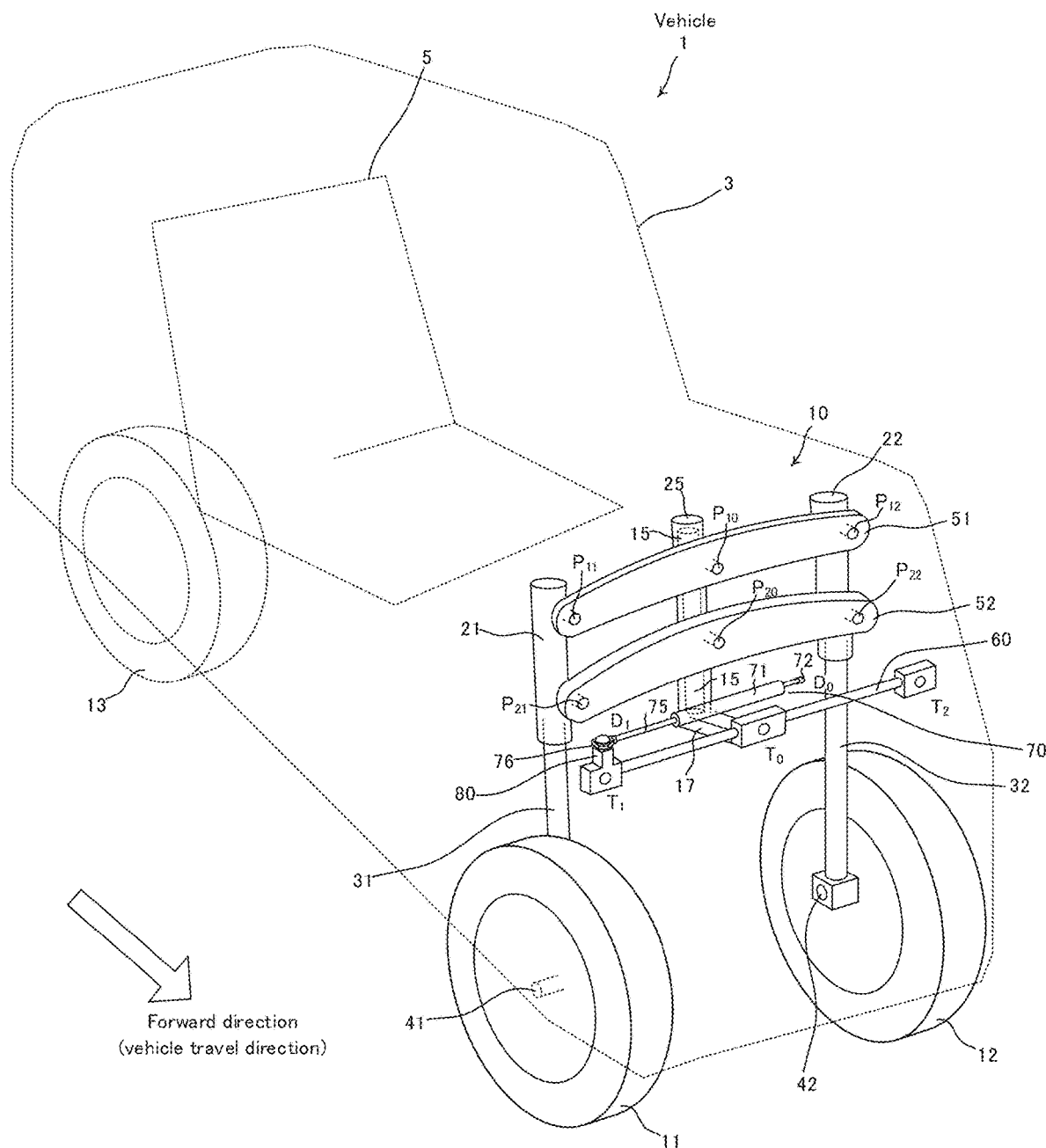
FIG. 1 is a view illustrating the overview of a vehicle 1 according to an embodiment of the present invention.

Hereinafter, embodiments of the present invention will be described with reference to the drawings. FIG. 1 is a view illustrating the overview of a vehicle 1 according to an embodiment of the present invention.

In the present embodiment, a vehicle provided with two front wheels (right front wheel 11, left front wheel 12) having both a lean mechanism that leans (inclines) a vehicle body 3 and a mechanism that performs steering and one rear wheel 13 to be driven into rotation by a motor is taken as an example of the vehicle 1. However, the vehicle 1 according to the present invention is not limited to this, but the idea of the present invention can be applied to any vehicle provided with two or more wheels.

Further, the lean mechanism for the vehicle body 3 includes all lean mechanisms, such as one in which a not-shown controller of the vehicle 1 controls lean operation; one in which a driver himself or herself performs lean operation of the vehicle 1 and the vehicle 1 assists the driver's lean operation; and one in which only a driver himself or herself performs lean operation of the vehicle 1.

In the following embodiments, it is assumed that both the right front wheel 11 and the left front wheel 12 have the lean mechanism and applied with a steering torque; however, a case where the front wheel(s) is applied with a steering toque, and a rear wheel(s) has the lean mechanism, and a case where the rear wheel(s) is applied with a steering toque, and a front wheel(s) has the lean mechanism are included in the scope of the present invention.

Further, both a configuration in which a not-shown input member (steering wheel, joystick, etc.) for inputting the turning direction of the vehicle 1 to the vehicle 1 and a steering member for two front wheels (right front wheel 11, left front wheel 12) which are steered wheels are completely mechanically separated from each other and a configuration in which the input member and a steering member for two front wheels (right front wheel 11, left front wheel 12) which are steered wheels are mechanically loosely connected (by, e.g., a spring) are included in the scope of the present invention.

For example, the input member may be an input shaft like a steering wheel shaft that a driver turns for turning the vehicle, and the steering member may be a steering shaft that is turned with steering of the steered wheels.

"The input member and the steering member are mechanically loosely connected" refers to a state where the input member and the steering member are connected with a fastening force allowing the steering angle of the steered wheels to follow the turning direction determined by the inclination of the vehicle body and allowing for torque transmission from the steering member to the input member.

Further, "mechanically loosely connected" can be rephrased to "mechanically semi-connected".

The two front wheels (right front wheel 11, left front wheel 12) of the vehicle 1 each have a predetermined trail, which allows the vehicle 1 to turn following the lean operation of the vehicle body 3 even when a steering mechanism for the front wheels (right front wheel 11, left front wheel 12) does not function with the lean operation of the vehicle body 3.

A seat 5 for a driver is provided inside the vehicle body 3 of the vehicle 1. The driver sits on the seat 5 and operates a device (not illustrated) for inputting turning directions or a device (not illustrated) for inputting speeds.

A turning mechanism 10 is provided at the front side of the vehicle body 3. The turning mechanism 10 has two mechanisms of a lean mechanism that leans (inclines) the vehicle body 3 by providing a difference in height between the right front wheel 11 and the left front wheel 12 and a steering mechanism that steers the right front wheel 11 and left front wheel 12.

In the present embodiment, the turning mechanism 10 performs the lean and steering operations for the two wheels; however, the turning mechanism 10 may perform the lean and steering operations for only one wheel.

The turning mechanism 10 has a right suspension arm 31 and a left suspension arm 32 that suspend the right front wheel 11 and the left front wheel 12, respectively. The right suspension arm 31 is attached to the right front wheel 11 through a right front wheel axel 41, and the left suspension arm 32 is attached to the left front wheel 12 through a left front wheel axel 42, whereby the right front wheel 11 and the left front wheel 12 are rotated with respect to the right suspension arm 31 and the left suspension arm 32, respectively, allowing the vehicle 1 to travel.

The right front wheel 11 and the left front wheel 12 are freely turnable with respect to the right suspension arm 31 and the left suspension arm 32, respectively, thereby allowing a predetermined steering angle to be given to the right front wheel 11 and the left front wheel 12.

The right suspension arm 31 and the left suspension arm 32 are housed in a right suspension pole 21 and a left suspension pole 22, respectively, so as to be suspended thereto. The right suspension pole 21 and the left suspension pole 22 form a parallel link together with horizontally-installed first and second horizontal links 51 and 52. As illustrated, the turning centers of the parallel link are designated as $P_{11}$, $P_{12}$, $P_{21}$ and $P_{22}$.

A center tube 25 fixed to the vehicle body 3 is provided between the right suspension pole 21 and the left suspension pole 22. The first horizontal link 51 is freely turnable with respect to the center tube 25 at $P_{10}$, and the second horizontal link 52 is freely turnable with respect to the center tube 25 at $P_{20}$.

The first horizontal link 51 can be turned, by a not-shown motor, with respect to the center tube 25 about $P_{10}$. With this configuration, lifting of the right suspension pole 21 housing the right suspension arm 31 and lowering of the left suspension pole 22 housing the left suspension arm 32 can be simultaneously performed through the horizontal link, whereby the vehicle body 3 can be leaned.

A center pole 15 is turnably housed in the inner tube portion of the center tube 25. Further, a center pole extending part 17 extends forward of the vehicle 1 from the bottom of the center pole 15, and a tie rod 60 that equalizes the steering angles of the right front wheel 11 and left front wheel 12 is attached to the center pole extending part 17 so as to be freely turnable at $T_0$. The tie rod 60 is attached to a knuckle arm (not illustrated) of the right front wheel 11 at $T_1$ and to a knuckle arm (not illustrated) of the the left front wheel 12 at $T_2$.

In the vehicle 1 according to the embodiment of the present invention, a damper 70 is provided. The damper 70 functions as a torque applying part that applies a torque so as to adjust the steering operation of the right front wheel 11 and the left front wheel 12 in accordance with the inclination (more specifically, the inclination angular velocity or inclination angular acceleration of the vehicle body 3) of the vehicle body 3 by the lean mechanism. Although the damper 70 or the like which is an elastic member is used as a mechanical element constituting the torque applying part in the present embodiment, other mechanical elements (e.g., spring) or mechanical elements to be electrically driven may be used. That is, any elastic member that exhibits effectiveness (expands and contracts) only when there is a relative speed between one element and the other element can be used.

Further, the mechanical element of the lean mechanism including the damper 70 functions also as an inclination angle detection part in the present invention.

A cylinder side attachment part 72 extending from a cylinder 71 of the damper 70 is freely turnably attached to the vehicle body 3. The attachment point of the cylinder side attachment part 72 is designated as $D_0$. Further, a piston rod side attachment part 76 extending from a piston rod 75 is freely turnably attached to a damper link 80. The attachment point of the piston rod side attachment part 76 is designated as $D_1$.

The damper link 80 is a rigid member attached to one end of the tie rod 60. It is designed such that when the tie rod 60 is horizontal, $D_1$ is disposed just above $T_1$ of the tie rod 60. Further, the damper link 80 is freely turnable with respect to $D_1$ on the damper 70 side.

Since the tie rod 60 having rigidity is provided, the angle between a straight line $D_1$-$T_1$ and a straight line $T_1$-$T_0$ (or a straight line $T_1$-$T_2$) is always kept 90°. Further, the distance between $D_1$ on the damper 70 side and $T_1$ of the tie rod 60 is always kept constant.

Figure 2:
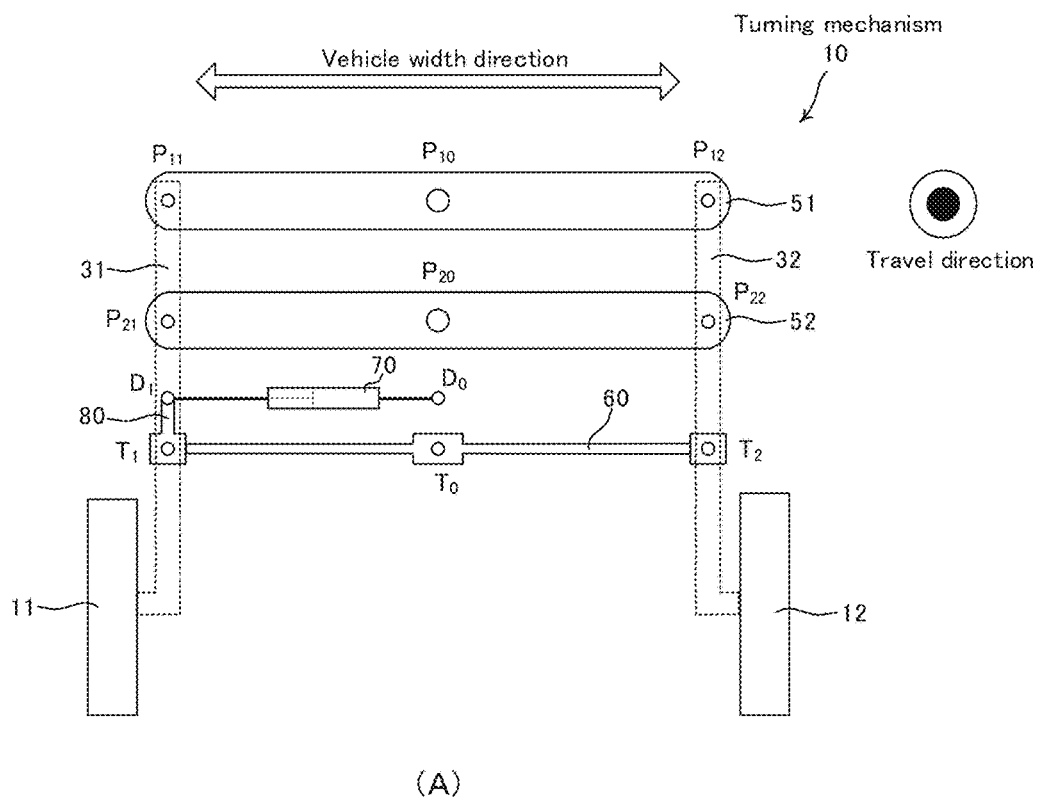
FIGS. 2A and 2B are views each illustrating a turning mechanism 10 of the vehicle 1 according to the embodiment of the present invention.
Figure 2:
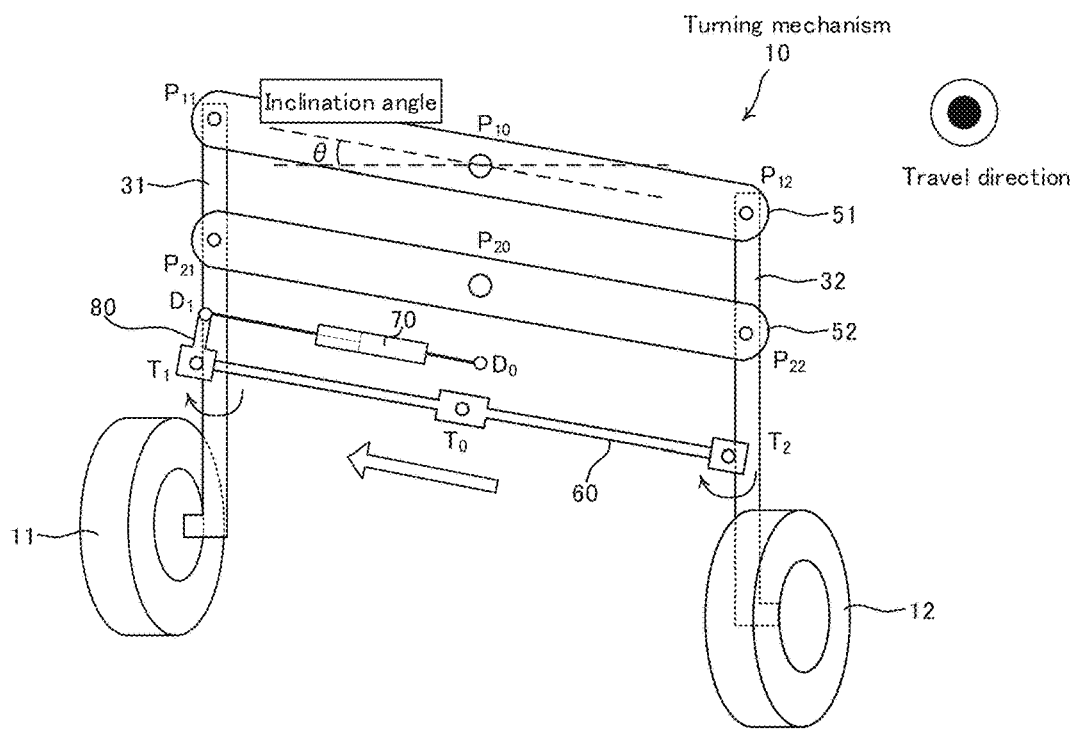

An example of turning operation by the thus configured turning mechanism 10 of the vehicle 1 according to the present invention will be described using FIGS. 2A and 2B. FIGS. 2A and 2B are views each illustrating the turning mechanism 10 of the vehicle 1 according to the embodiment of the present invention, as viewed from the front of the vehicle 1. FIG. 2A illustrates a state where the vehicle 1 goes straight ahead, and FIG. 2B illustrates a state where the vehicle 1 turns right.

When the first horizontal link 51 is inclined at an inclination angle θ by a not-shown motor, the right suspension arm 31 is lifted by the horizontal link and, at the same time, the left suspension arm 32 is lowered, whereby the vehicle body 3 is inclined so as to turn the vehicle 1 to the right.

The inclination angle θ is also defined as the inclination angle about the roll axis of the vehicle body of the vehicle 1.

At the same time, $T_1$ and $T_1$ on the tie rod 60 side are displaced leftward, and the right front wheel 11 and the left front wheel 12 connected through the tie rod 60 are steered so as to turn in the same direction as a travel direction determined by the lean of the vehicle body 3, as illustrated in FIG. 2B. On the other hand, the damper link 80 attached to the tie rod 60 causes $D_1$ to push the damper 70, whereby a torque to be applied to the steering of the right front wheel 11 and the left front wheel 12 is generated by the damper 70.

In the turning operation as described above, the position of $D_1$ on the damper 70 side can be appropriately adjusted by changing, e.g., the characteristics of the damper 70. Thus, in the vehicle 1 according to the present invention, the steering operation of the right front wheel 11 and the left front wheel 12 can be adjusted by the damper 70 functioning as a torque applying part that applies a steering torque.

Figure 3:
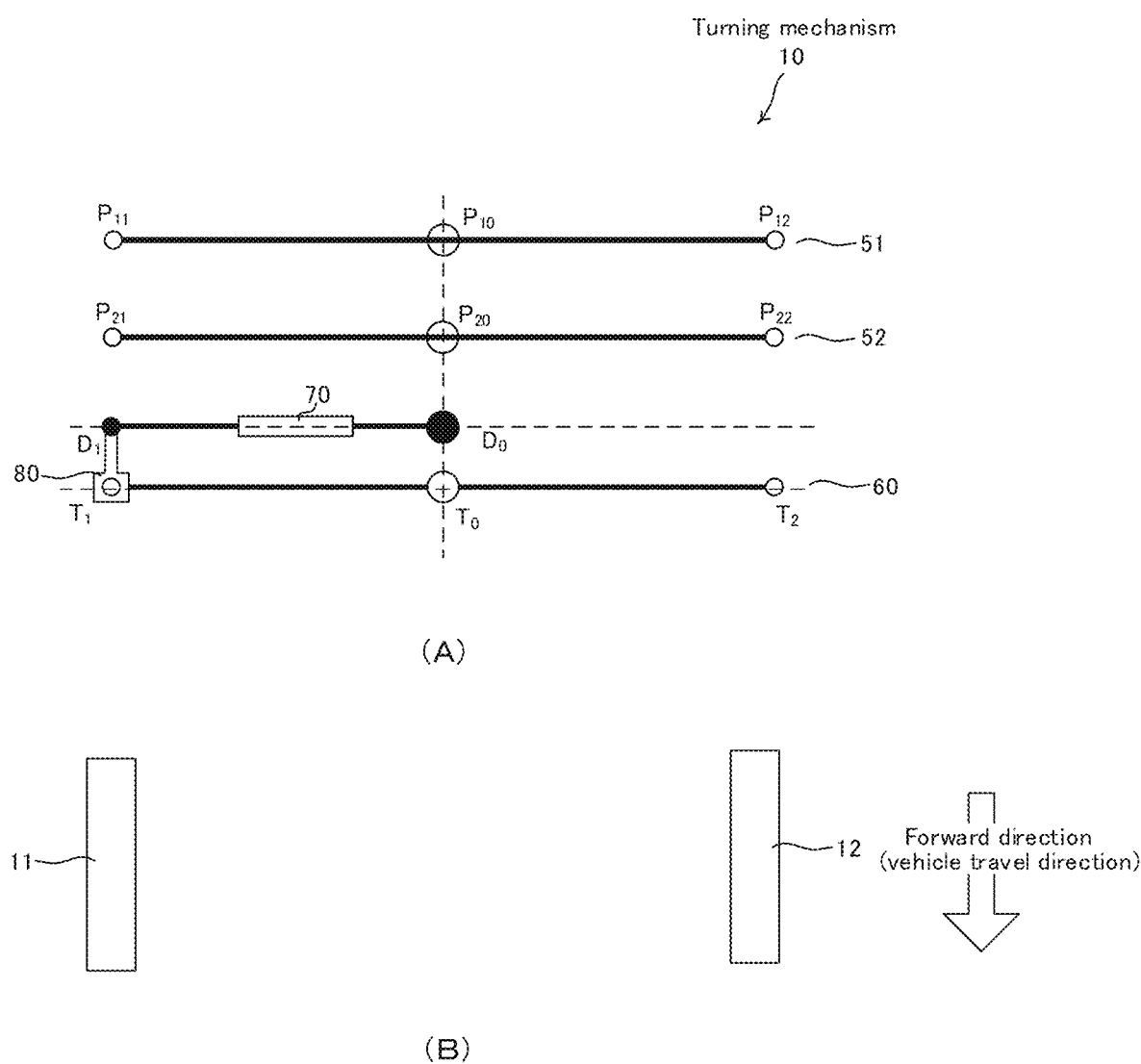
FIGS. 3A and 3B are views schematically illustrating the turning mechanism 10 of the vehicle 1 according to a first embodiment of the present invention.
Figure 4:
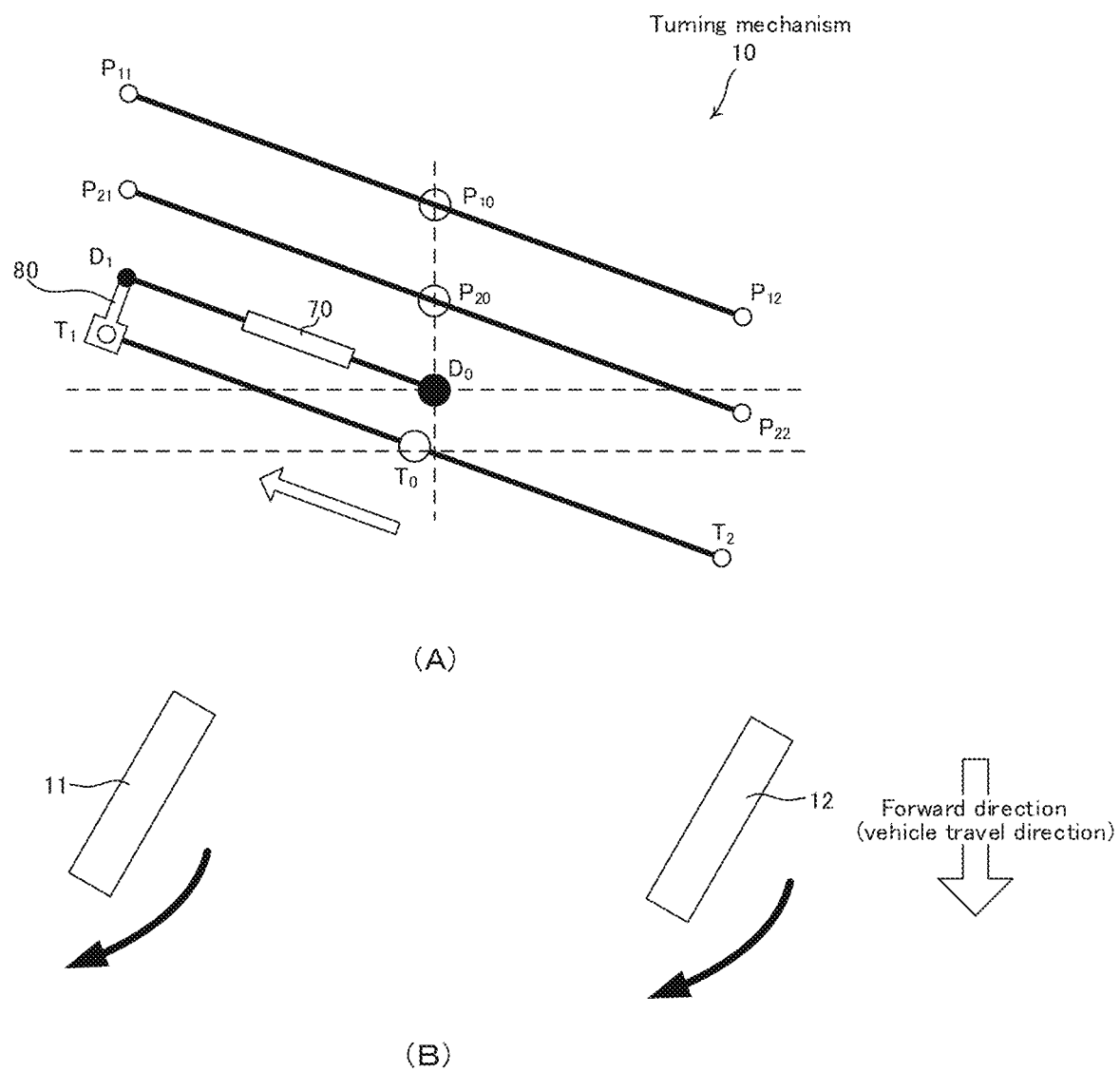
FIGS. 4A and 4B are views schematically illustrating the turning mechanism 10 of the vehicle 1 according to the first embodiment of the present invention.

FIG. 3A schematically illustrates the turning mechanism 10 in the state illustrated in FIG. 2A, and FIG. 4A schematically illustrates the turning mechanism 10 in the state illustrated in FIG. 2B. FIG. 3B is a top view illustrating a state where the right front wheel 11 and the left front wheel 12 are steered when the turning mechanism 10 is in the state of FIG. 3A as viewed from above the vehicle 1, and FIG. 4B is a top view illustrating a state where the right front wheel 11 and the left front wheel 12 are steered when the turning mechanism 10 is in the state of FIG. 4A as viewed from above the vehicle 1. Hereinafter, the turning mechanism 10 according to the present invention is represented in the manner as in FIGS. 3A and 3B or FIGS. 4A and 4B.

FIGS. 4A and 4B illustrate a case where the turning mechanism 10 performs lean operation for turning right. At this time, steering is performed while a steering torque including a torque resisting a pushing force that $D_1$ of the damper link 80 applies to the damper 70 is applied to the right front wheel 11 and the left front wheel 12.

Figure 5:
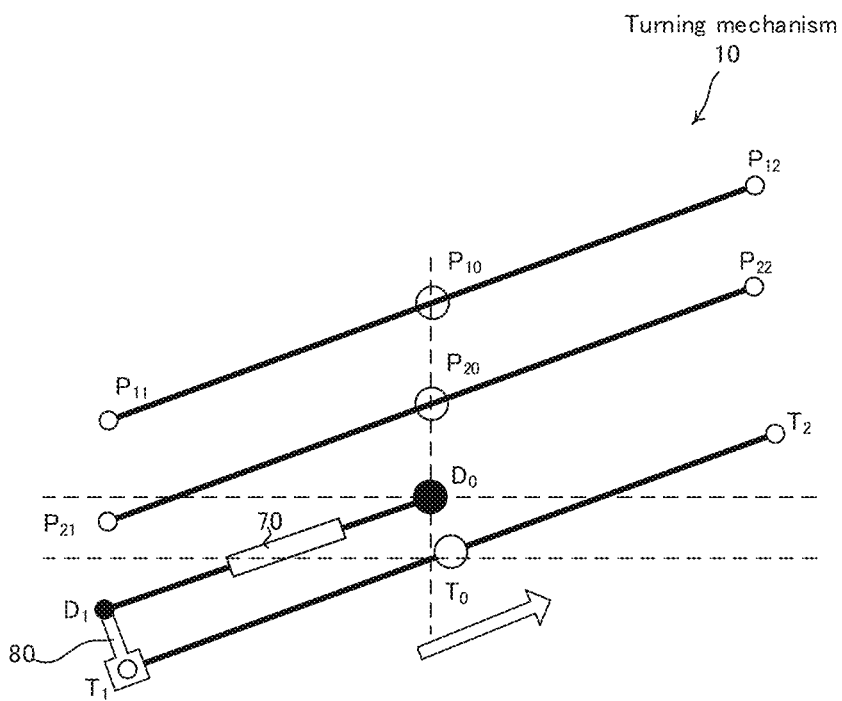
FIGS. 5A and 5B are views schematically illustrating the turning mechanism 10 of the vehicle 1 according to the first embodiment of the present invention.
Figure 5:
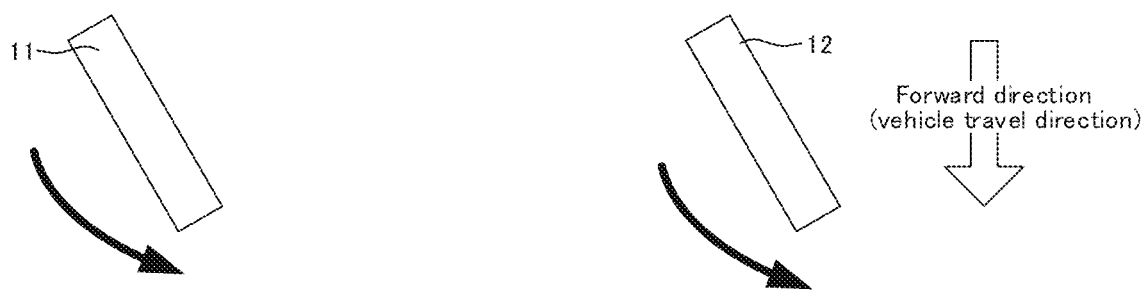

On the other hand, FIGS. 5A and 5B illustrate a case where the turning mechanism 10 performs lean operation for turning left. At this time, steering is performed while a steering torque including a torque resisting a pulling force that $D_1$ of the damper link 80 applies to the damper 70 is applied to the right front wheel 11 and the left front wheel 12.

The damper 70 generates a torque according to the displacement speed of the damper 70 when it is pushed or pulled and, thus, it can be seen that, in the present embodiment, a steering torque including a torque corresponding to the the inclination angular velocity (dθ/dt) can be applied to the right front wheel 11 and the left front wheel 12 as steered wheels.

According to the first embodiment described above, the right front wheel 11 and the left front wheel 12 are steered so as to turn in the same direction as a travel direction (operation direction) determined by the lean of the vehicle body 3, whereby the above (problem 1) can be solved.

The following describes another embodiment of the present invention. FIGS. 6A and 6B and FIGS. 7A and 7B are views schematically illustrating the turning mechanism 10 of the vehicle 1 according to a second embodiment of the present invention.

Figure 6:
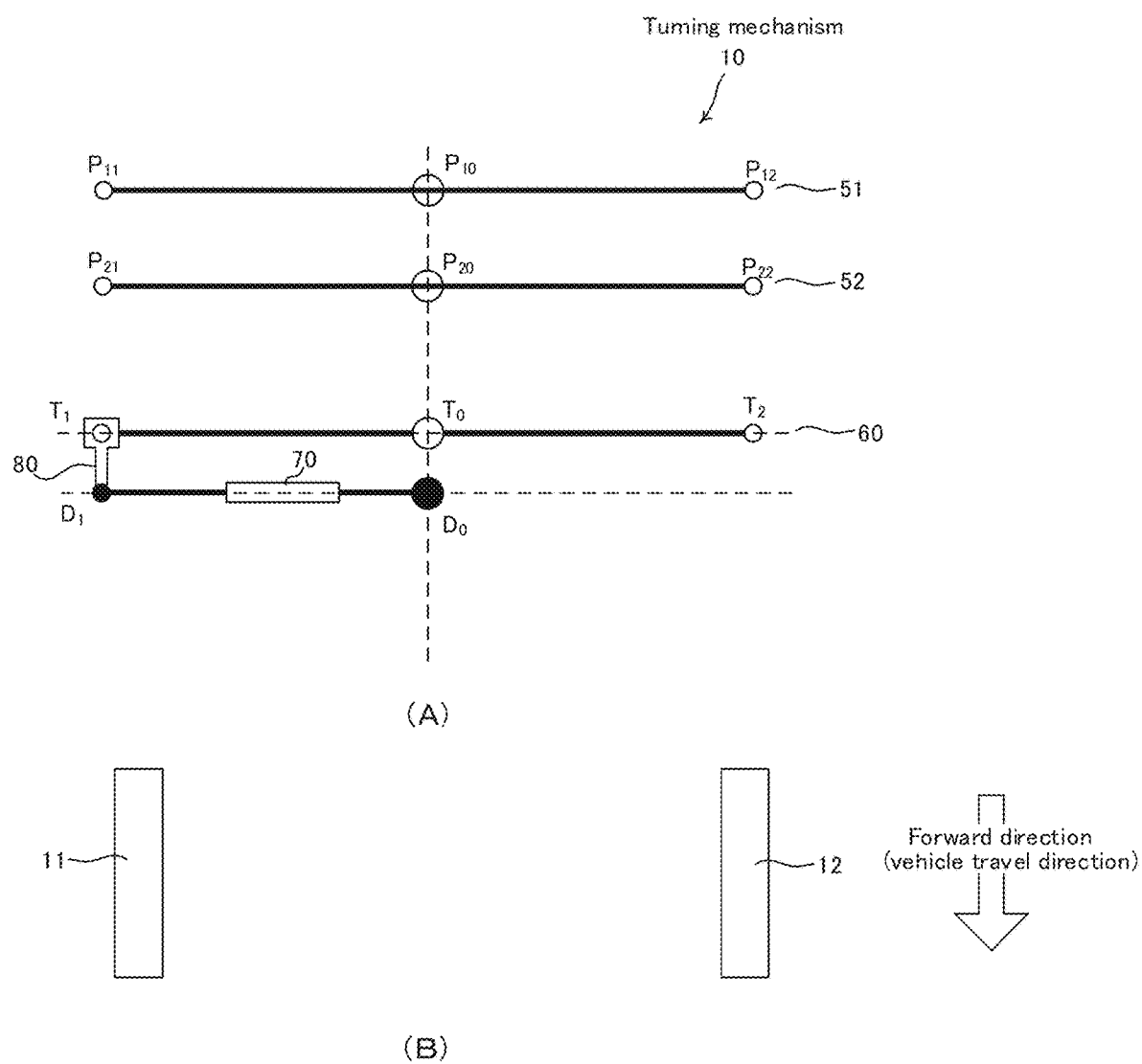
FIGS. 6A and 6B are views schematically illustrating the turning mechanism 10 of the vehicle 1 according to a second embodiment of the present invention.
Figure 7:
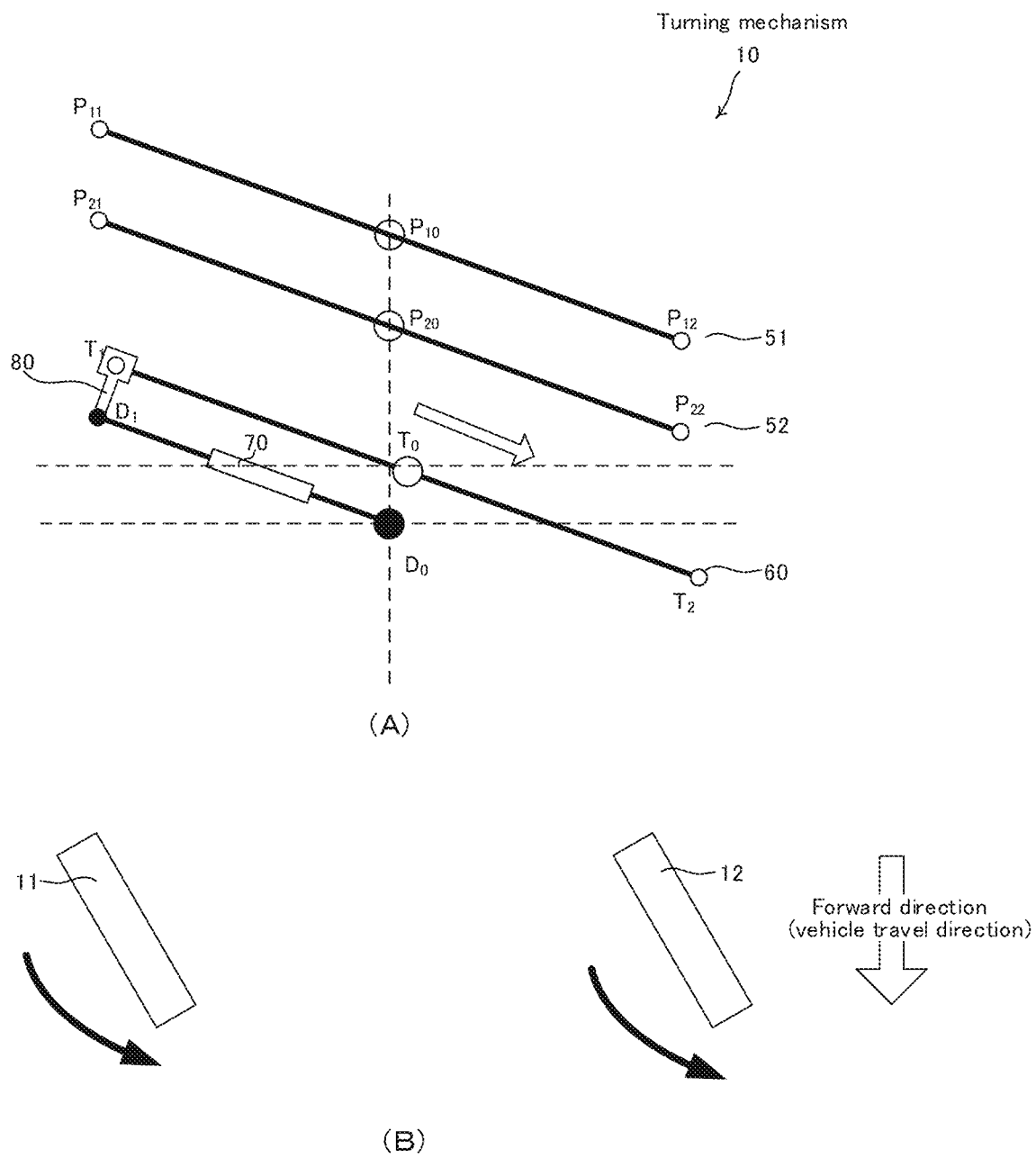
FIGS. 7A and 7B are views schematically illustrating the turning mechanism 10 of the vehicle 1 according to the second embodiment of the present invention.

FIGS. 6A and 6B are schematic views each illustrating the turning mechanism 10 when the vehicle 1 goes straight ahead, and FIGS. 7A and 7B are schematic views each illustrating the turning mechanism 10 when the vehicle body 3 is inclined rightward so as to turn the vehicle 1 to the right.

The turning mechanism 10 of the vehicle 1 according to the second embodiment of the present invention and that according to the first embodiment differ in the following respect. That is, in the first embodiment, components related to the damper 70 are provided above the tie rod 60, while in the second embodiment, components related to the damper 70 are provided below the tie rod 60.

As illustrated in FIGS. 7A and 7B, when the vehicle body 3 is inclined so as to turn the vehicle 1 to the right, steering is performed while a steering torque including a torque resisting a pulling force that $D_1$ of the damper link 80 applies to the damper 70 is applied to the right front wheel 11 and the left front wheel 12. As a result, the tie rod 60 attached to the damper link 80 is displaced rightward and, thus, a steering angle in the direction opposite to a travel direction determined by the lean of the vehicle body 3 is applied to the right front wheel 11 and the left front wheel 12. That is, a state where a reverse steering operation is performed can be reproduced.

According to the second embodiment described above, the right front wheel 11 and the left front wheel 12 are steered so as to turn in the direction opposite to a travel direction (operation direction) determined by the lean of the vehicle body 3, whereby the above (problem 2) can be solved.

Further, a comparison between the first and second embodiments reveals that, in the vehicle 1 according to the present invention, a steering torque that the torque applying part related to the damper 70 can adjust relates to a steering angle direction and/or a steering operation speed.

The following describes still another embodiment of the present invention. FIGS. 8A and 8B and FIGS. 9A and 9B are views schematically illustrating the turning mechanism 10 of the vehicle 1 according to a third embodiment of the present invention.

Figure 8:
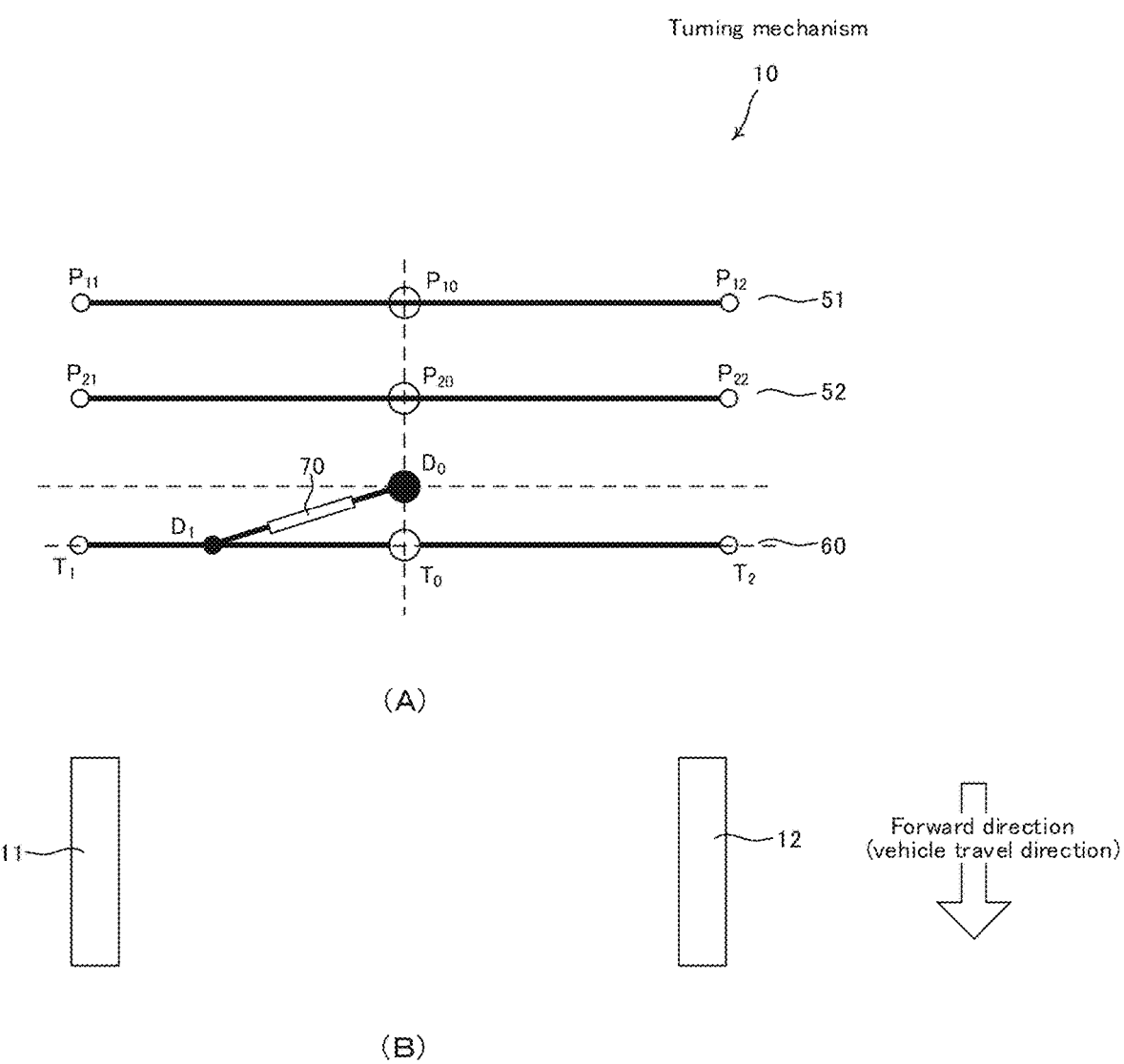
FIGS. 8A and 8B are views schematically illustrating the turning mechanism 10 of the vehicle 1 according to a third embodiment of the present invention.

FIGS. 8A and 8B are schematic views each illustrating the turning mechanism 10 when the vehicle 1 goes straight ahead, and FIGS. 9A and 9B are schematic views each illustrating the turning mechanism 10 when the vehicle body 3 is inclined rightward so as to turn the vehicle 1 to the right.

The turning mechanism 10 of the vehicle 1 according to the third embodiment of the present invention and that according to the first embodiment differ in the following respect. That is, in the first embodiment, components related to the damper 70 are provided above the tie rod 60 through the damper link 80, while in the third embodiment, components related to the damper 70 are directly connected to the tie rod 60.

Figure 9:
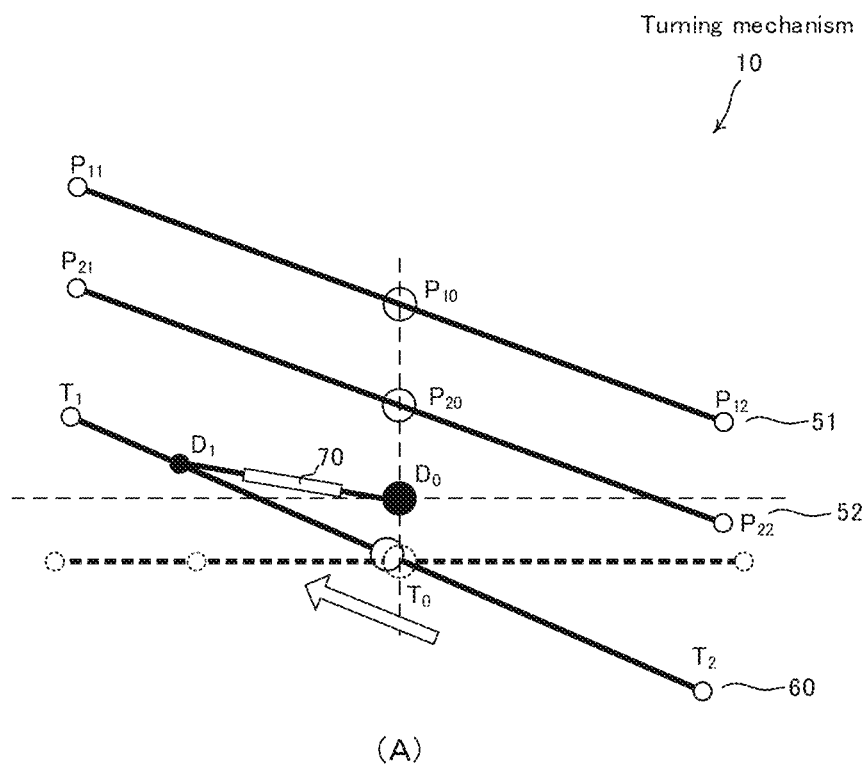
FIGS. 9A and 9B are views schematically illustrating the turning mechanism 10 of the vehicle 1 according to the third embodiment of the present invention.
Figure 9:
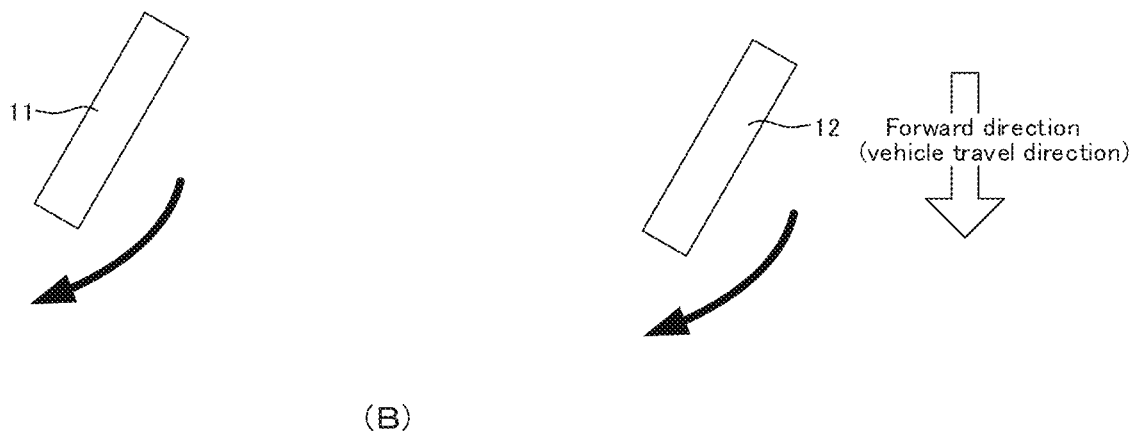
Figure 10:
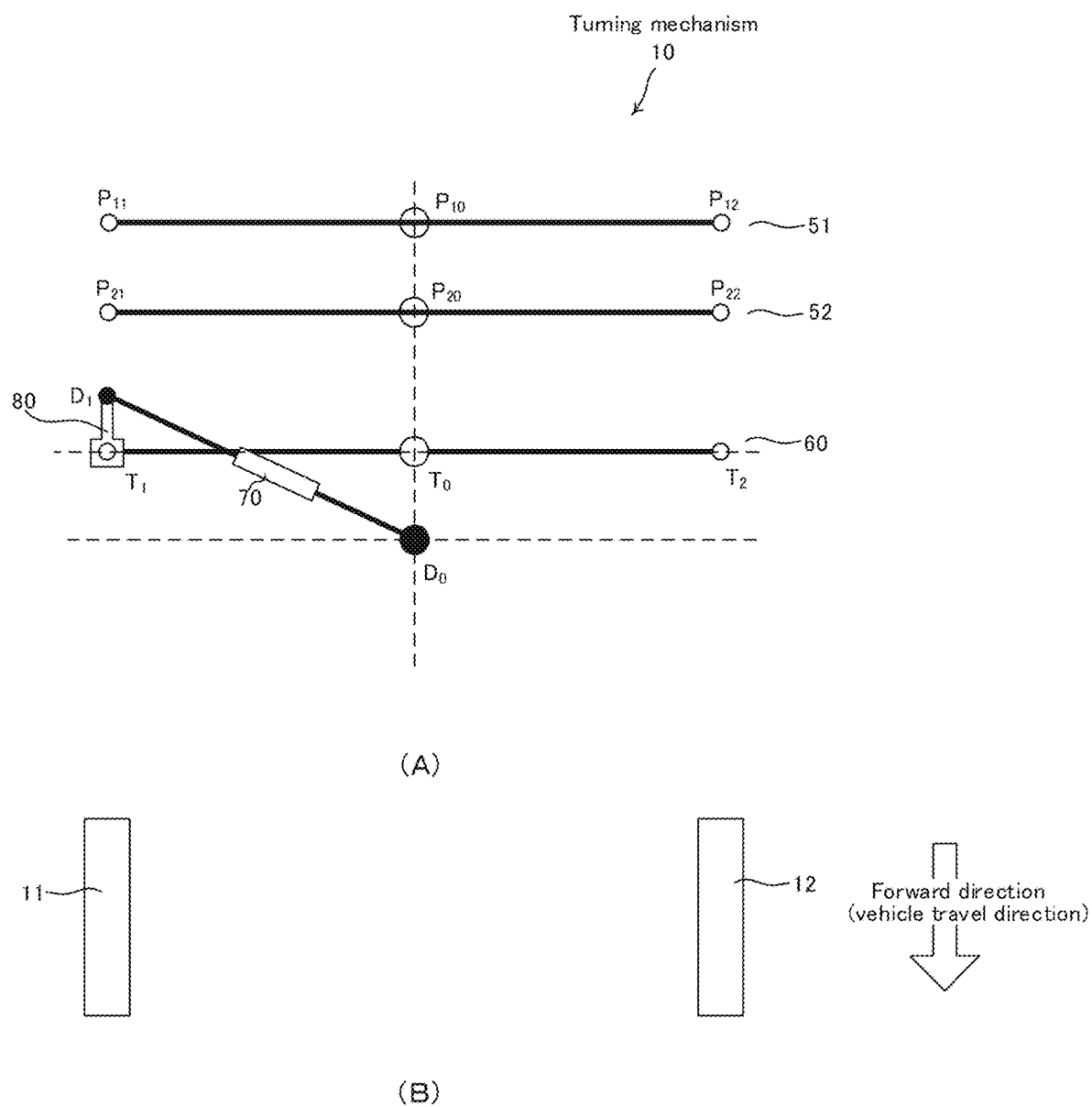
FIGS. 10A and 10B are views schematically illustrating the turning mechanism 10 of the vehicle 1 according to a fourth embodiment of the present invention.

As illustrated in FIG. 9, when the vehicle body 3 is inclined so as to turn the vehicle 1 to the right, steering is performed while a steering torque including a torque resisting a pulling force that $D_1$ of the damper link 80 applies to the damper 70 is applied to the right front wheel 11 and the left front wheel 12. As a result, the tie rod 60 attached to the damper link 80 is displaced rightward and, thus, a steering angle in the same direction as a travel direction determined by the lean of the vehicle body 3 is applied to the right front wheel 11 and left front wheel 12.

According to the third embodiment described above, the right front wheel 11 and the left front wheel 12 are steered so as to turn in the same direction as a travel direction (operation direction) determined by the lean of the vehicle body 3, whereby the above (problem 1) can be solved.

The following describes still another embodiment of the present invention. FIGS. 10A and 10B and FIGS. 11A and 11B are views schematically illustrating the turning mechanism 10 of the vehicle 1 according to a fourth embodiment of the present invention.

The turning mechanism 10 of the vehicle 1 according to the fourth embodiment and that according to the first embodiment of the present invention differ in the following respect. That is, in the first embodiment, components related to the damper 70 are provided above the tie rod 60 through the damper link 80, while in the second embodiment, components related to the damper 70 and the tie rod 60 are provided so as to cross each other.

Figure 11:
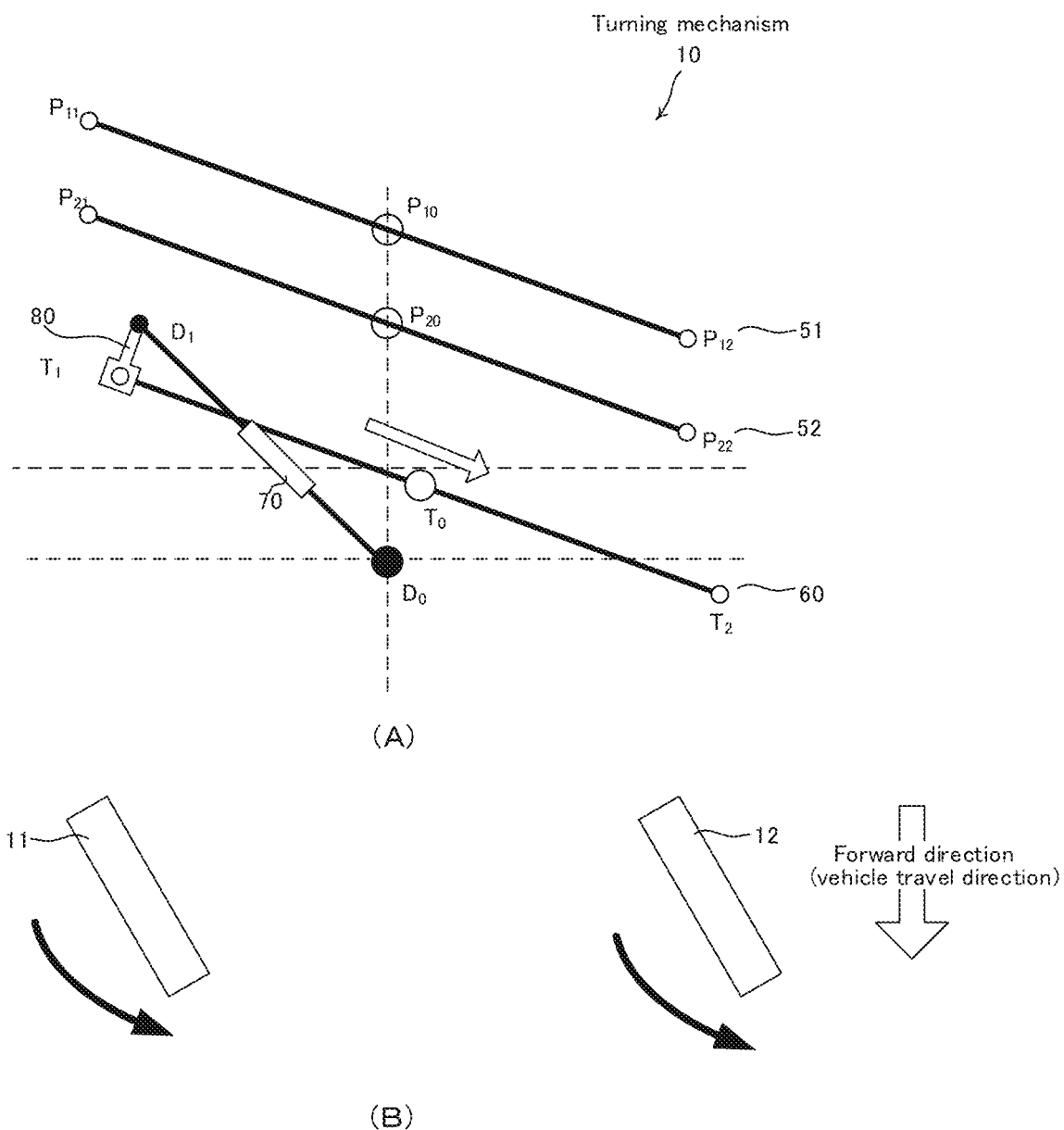
FIGS. 11A and 11B are views schematically illustrating the turning mechanism 10 of the vehicle 1 according to the fourth embodiment of the present invention.

As illustrated in FIGS. 11A and 11B, when the vehicle body 3 is inclined so as to turn the vehicle 1 to the right, steering is performed while a steering torque including a torque resisting a pulling force that $D_1$ of the damper link 80 applies to the damper 70 is applied to the right front wheel 11 and the left front wheel 12. As a result, the tie rod 60 attached to the damper link 80 is displaced rightward and, thus, a steering angle in the direction opposite to a travel direction determined by the lean of the vehicle body 3 is applied to the right front wheel 11 and the left front wheel 12. That is, a state where a a reverse steering operation is performed can be reproduced.

According to the second embodiment described above, the right front wheel 11 and the left front wheel 12 are steered so as to turn in the direction opposite to a travel direction (operation direction) determined by the lean of the vehicle body 3, whereby the above (problem 2) can be solved.

Figure 12:
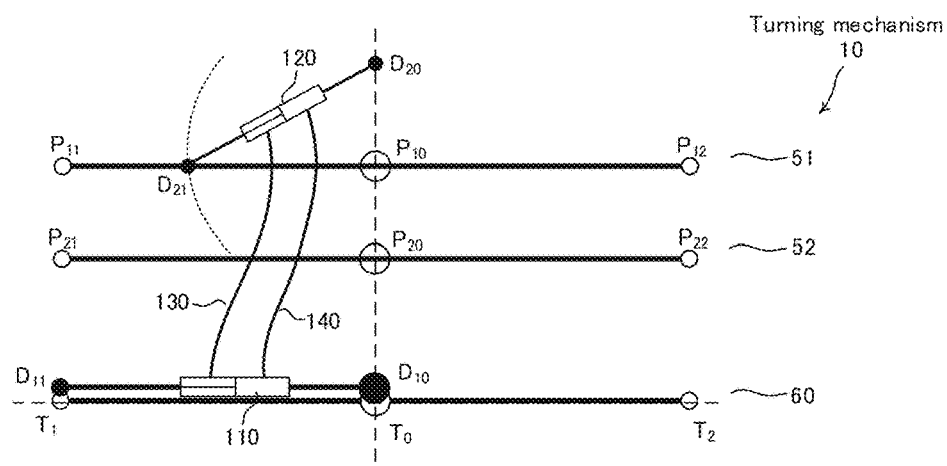
FIGS. 12A and 12B are views schematically illustrating the turning mechanism 10 of the vehicle 1 according to a fifth embodiment of the present invention.
Figure 12:
Figure 13:
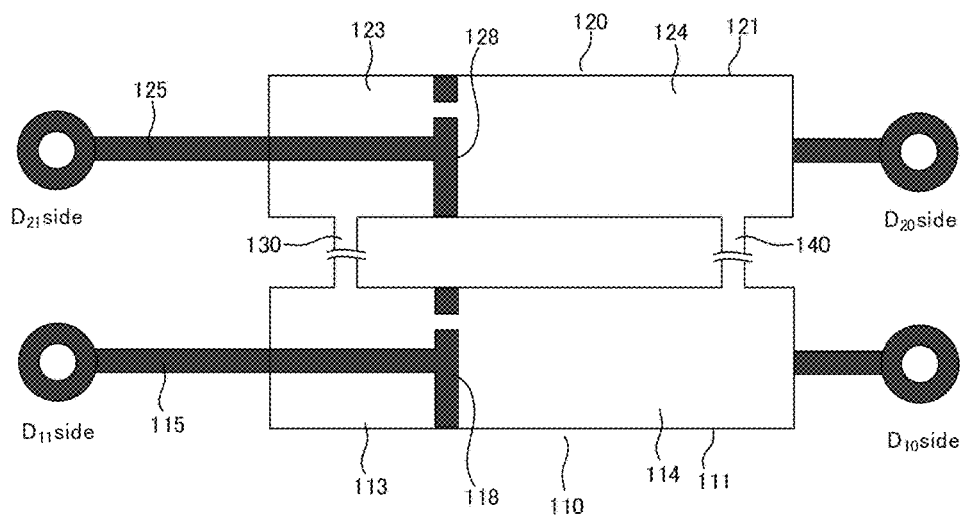
FIG. 13 is a view explaining connection between a first damper 110 and a second damper 120 in the turning mechanism 10 of the vehicle 1 according to the fifth embodiment of the present invention.

The following describes still another embodiment of the present invention. FIGS. 12A and 12B are views schematically illustrating the turning mechanism 10 of the vehicle 1 according to a fifth embodiment of the present invention. FIG. 13 is a view explaining connection between a first damper 110 and a second damper 120 in the turning mechanism 10 of the vehicle 1 according to the fifth embodiment of the present invention.

In the present embodiment, two dampers of the first and second dampers 110 and 120 are provided. The first damper 110 is attached to the tie rod 60 in the illustrated manner. For this attachment, the damper link 80 is not used.

On the other hand, the second damper 120 is attached to, e.g., the first horizontal link 51 in the illustrated manner.

As illustrated in FIG. 13, the first damper 110 has a configuration in which viscous fluid such as oil is filled in a cylinder 111, and a piston 118 having a through hole moves in the viscous fluid. The piston 118 separates the inner space of the cylinder 111 into a first chamber 113 and a second chamber 114. With the movement of a piston rod 115, a damping force of the damper is generated by the resistance of the viscous fluid against the movement of the piston 118.

Similarly, the second damper 120 has a configuration in which viscous fluid such as oil is filled in a cylinder 121, and a piston 128 having a through hole moves in the viscous fluid. The piston 128 separates the inner space of the cylinder 121 into a third chamber 123 and a fourth chamber 124. With the movement of a piston rod 125, a damping force of the damper is generated by the resistance of the viscous fluid against the movement of the piston 128.

In the present embodiment, the above-described two dampers are used. Further, the first chamber 113 of the first damper 110 and the third chamber 123 of the second damper 120 are connected through a first circulation tube 130, and the second chamber 114 of the first damper 110 and the fourth chamber 124 of the second damper 120 are connected through a second circulation tube 140. Thus, the viscous fluid can be exchanged between the two dampers.

Figure 14:
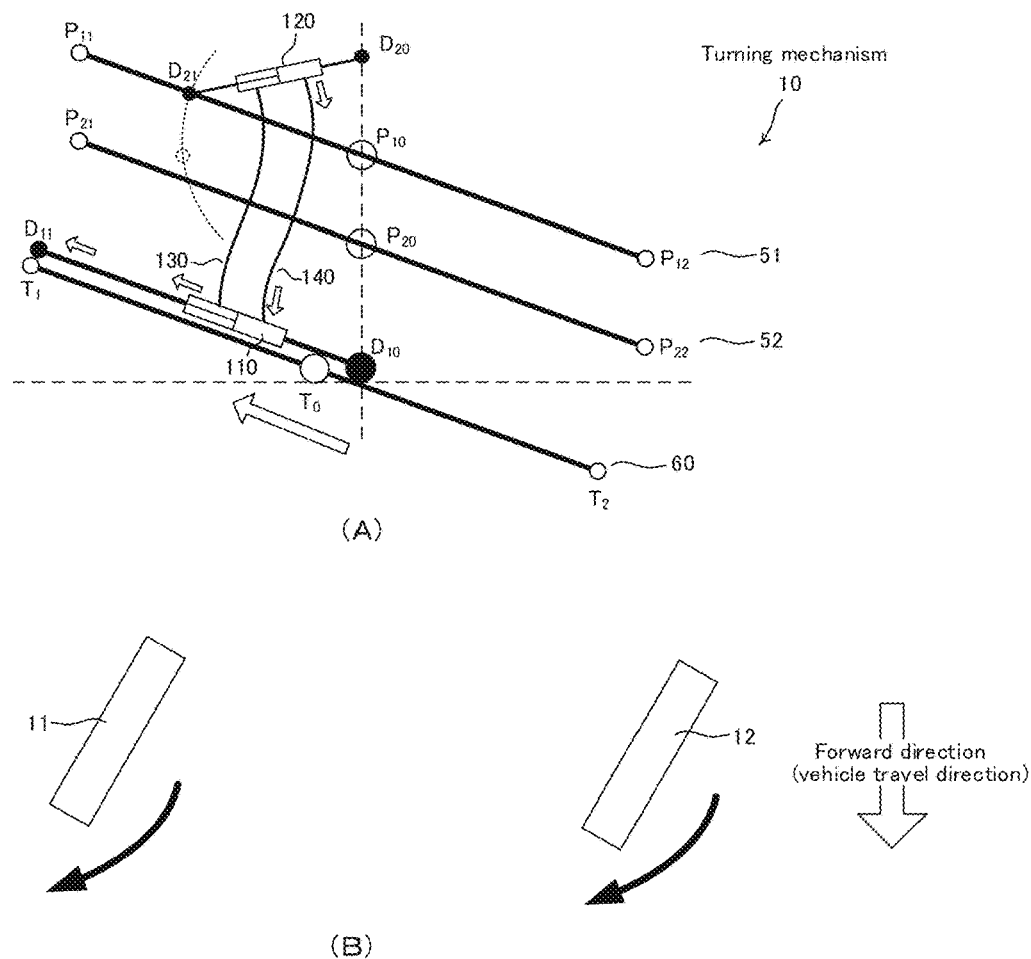
FIGS. 14A and 14B are views schematically illustrating the turning mechanism 10 of the vehicle 1 according to the fifth embodiment of the present invention.

In this configuration, when the vehicle body 3 is inclined so as to turn the vehicle 1 to the right as illustrated in FIG. 14, the second damper 120 attached to the first horizontal link 51 is contracted to cause the viscous fluid in the fourth chamber 124 to be supplied to the second chamber 114 of the first damper 110 through the second circulation tube 140. Thus, $D_{11}$ on the first damper 110 side is pushed in a direction away from $D_{10}$ as the turning center. As a result, the tie rod 60 attached to the damper link 80 is displaced leftward, whereby a steering torque in the same direction as a travel direction determined by the lean of the vehicle body 3 is applied to the right front wheel 11 and the left front wheel 12.

According to the fifth embodiment described above, the right front wheel 11 and the left front wheel 12 are steered so as to turn in the same direction as a travel direction (operation direction) determined by the lean of the vehicle body 3, whereby the above (problem 1) can be solved.

Figure 15:
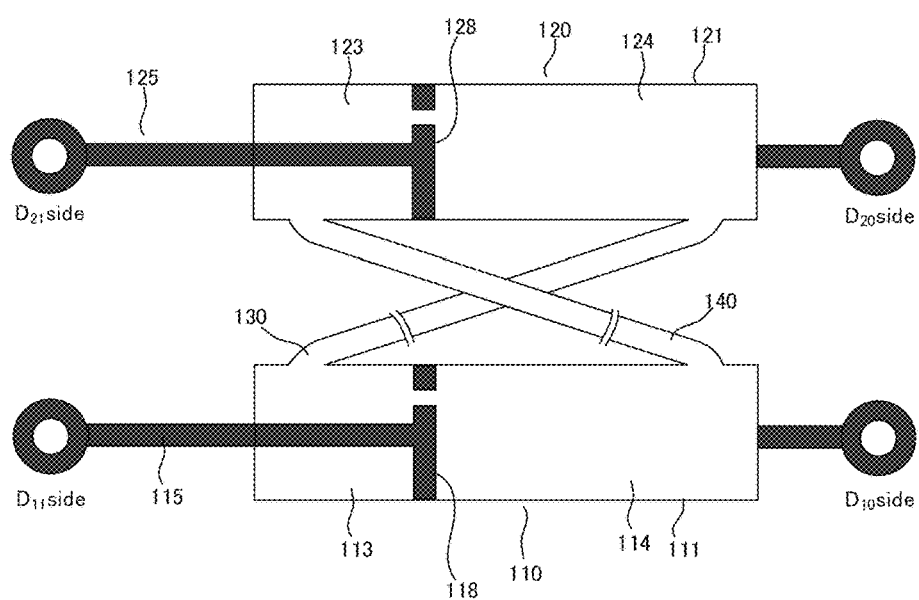
FIG. 15 is a view illustrating another example of the connection between the first and second dampers 110 and 120 in the turning mechanism 10 of the vehicle 1 according to the fifth embodiment of the present invention.

As illustrated in FIG. 15, the first and second dampers 110 and 120 may be connected such that the first chamber 113 of the first damper 110 and the fourth chamber 124 of the second damper 120 are connected through the first circulation tube 130 and that the second chamber 114 of the first damper 110 and the third chamber 123 of the second damper 120 are connected through the second circulation tube 140. In this case, a steering torque in the direction opposite to a travel direction (operation direction) determined by the lean of the vehicle body 3 is applied to the right front wheel 11 and the left front wheel 12.

According to the above configuration, the right front wheel 11 and the left front wheel 12 are steered so as to turn in the direction opposite to a travel direction (operation direction) determined by the lean of the vehicle body 3, whereby the above (problem 2) can be solved.

Figure 16:
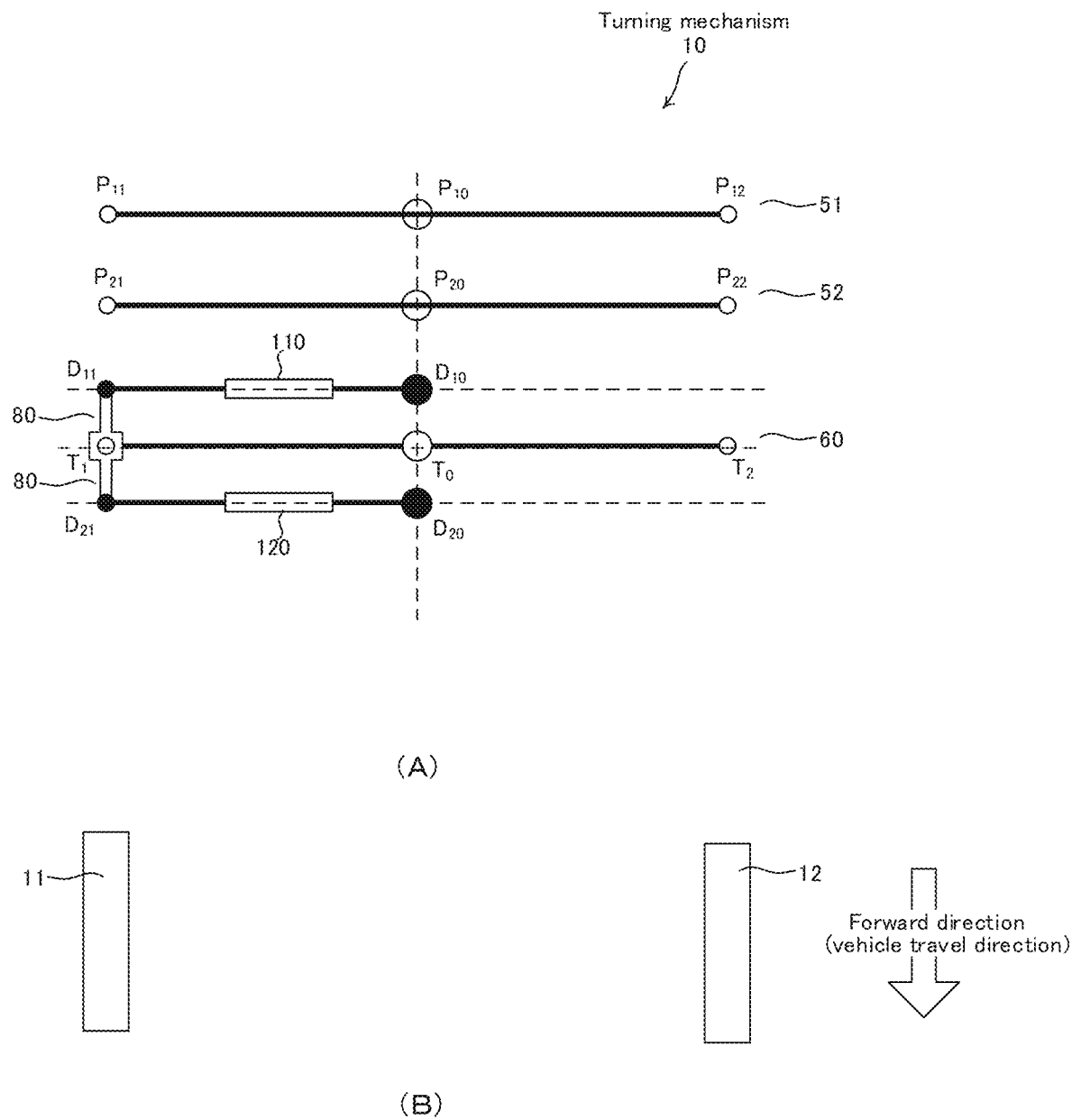
FIGS. 16A and 16B are views schematically illustrating the turning mechanism 10 of the vehicle 1 according to a sixth embodiment of the present invention.
Figure 17:
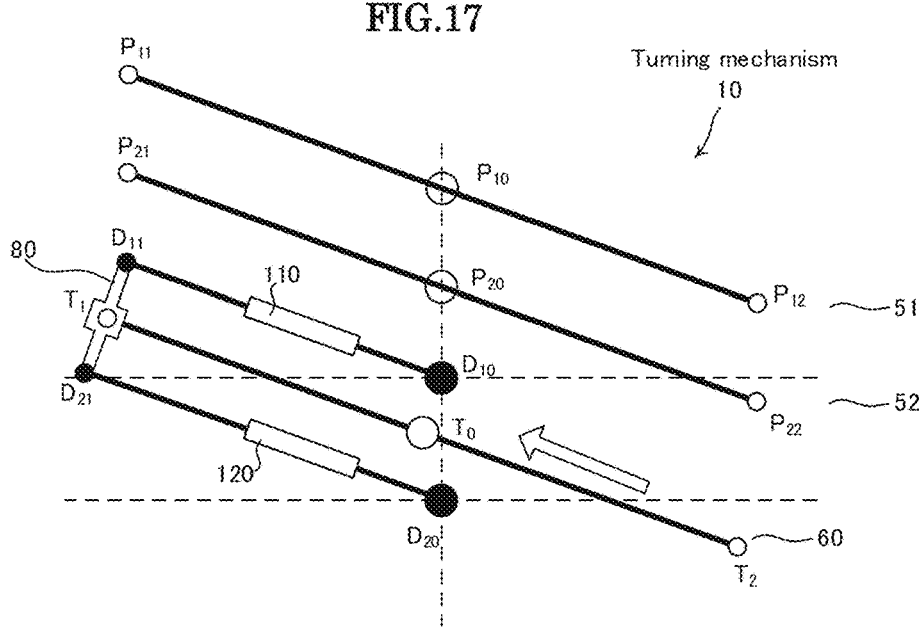
FIG. 17 is a view schematically illustrating the turning mechanism 10 of the vehicle 1 according to the sixth embodiment of the present invention.

The following describes still another embodiment of the present invention. FIGS. 16A and 16B and FIG. 17 are views schematically illustrating the turning mechanism 10 of the vehicle 1 according to a sixth embodiment of the present invention.

FIGS. 16A and 16B are schematic views each illustrating the turning mechanism 10 when the vehicle 1 goes straight ahead, and FIG. 17 is a schematic view illustrating the turning mechanism 10 when the vehicle body 3 is inclined rightward so as to turn the vehicle 1 to the right.

In the turning mechanism 10 of the vehicle 1 according to the sixth embodiment of the present invention, components related to the first damper 110 are provided above the tie rod 60, and components related to the second damper 120 are provided below the tie rod 60. In the present embodiment, the distance between $D_{11}$ and $T_1$ and the distance between $D_{21}$ and $T_1$ are kept constant by the damper link 80. An upper part of the damper link 80 is attached between $D_{11}$ on the first damper 110 side and $T_1$ of the tie rod 60 side and, similarly, a lower part of the damper link 80 is attached between $D_{21}$ on the second damper 120 side and $T_1$ of the tie rod 60 side.

In the present embodiment, characteristics of a resistance generated in accordance with the piston moving speed of the first damper 110 and characteristics of a resistance generated in accordance with the piston moving speed of the second damper 120 are set so as to differ from each other, and characteristics composed of the sum of the characteristics of the first damper 110 and the characteristics of the second damper 120 act on $T_1$ on the tie rod 60 side to thereby apply a steering torque to the right front wheel 11 and the left front wheel 12.

Figure 18:
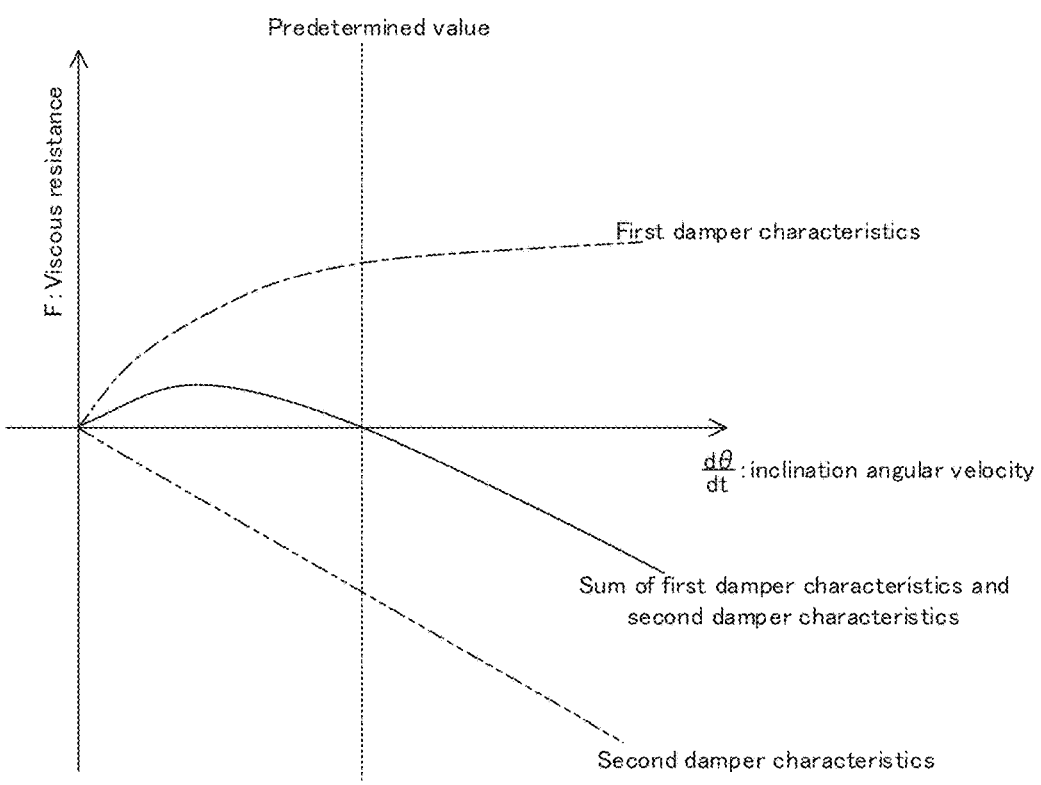
FIG. 18 is a view explaining characteristics composed of the sum of the characteristics of the first damper 110 and the characteristics of the second damper 120.

FIG. 18 is a view explaining the characteristics composed of the sum of the characteristics of the first damper 110 and the characteristics of the second damper 120, and the continuous line denotes the sum of the characteristics of the two dampers. Further, in FIG. 18, the horizontal axis indicates the angular velocity of the inclination angle of the vehicle body 3.

The sum of the characteristics of the two dampers denoted by the continuous line of FIG. 18 assumes a positive value when the inclination angular velocity of the vehicle body 3 is lower than a predetermined value and assumes a negative value when the inclination angular velocity of the vehicle body 3 is equal to or higher than the predetermined value. That is, the direction of a steering torque to be applied to the right front wheel 11 and the left front wheel 12 can be changed in accordance with the value of the inclination angular velocity of the vehicle body 3.

More specifically, the sum of the characteristics of the two dampers is used to set such that the right front wheel 11 and the left front wheel 12 are steered so as to turn in the same direction as a travel direction determined by the lean of the vehicle body 3 when the inclination angular velocity ($d\theta/dt$) of the vehicle body 3 is lower than a predetermined value and steered so as to turn in the direction opposite to a travel direction determined by the lean of the vehicle body 3 when the inclination angular velocity ($d\theta/dt$) of the vehicle body 3 is equal to or higher than the predetermined value.

With the configuration according to the present embodiment described above, the right front wheel 11 and the left front wheel 12 are steered so as to turn in the same direction as a travel direction (operation direction) determined by the lean of the vehicle body 3 when the inclination angular velocity of the vehicle 1 is low, thereby solving the above (problem 1) that the steered wheels may be delayed in following the lean of the vehicle body 3 to deteriorate turning responsiveness and, at the same time, the right front wheel 11 and left front wheel 12 are steered so as to turn in the direction opposite to a travel direction (operation direction) determined by the lean of the vehicle body 3 when the inclination angular velocity of the vehicle 1 is high, thereby solving the above (problem 2) that inertial force according to the angular velocity of the inclination angle of the vehicle body 3 acts on a driver to interfere with driver's driving operation.

Figure 19:
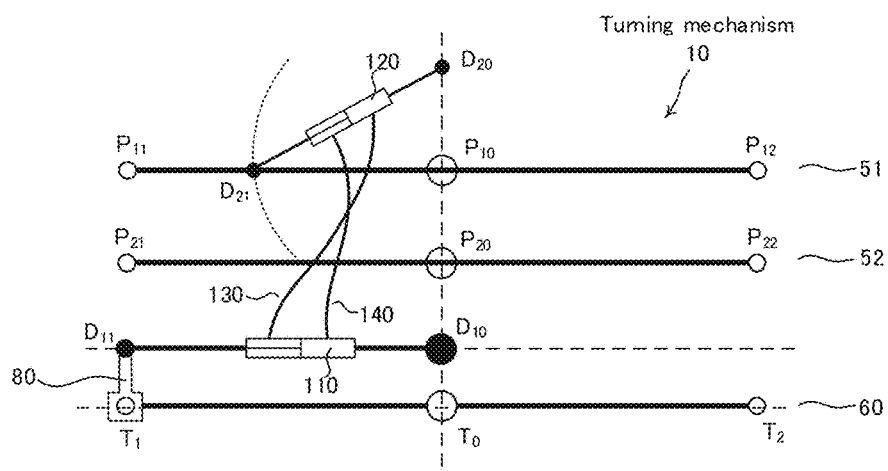
FIGS. 19A and 19B are views schematically illustrating the turning mechanism 10 of the vehicle 1 according to a seventh embodiment of the present invention.
Figure 19:
Figure 20:
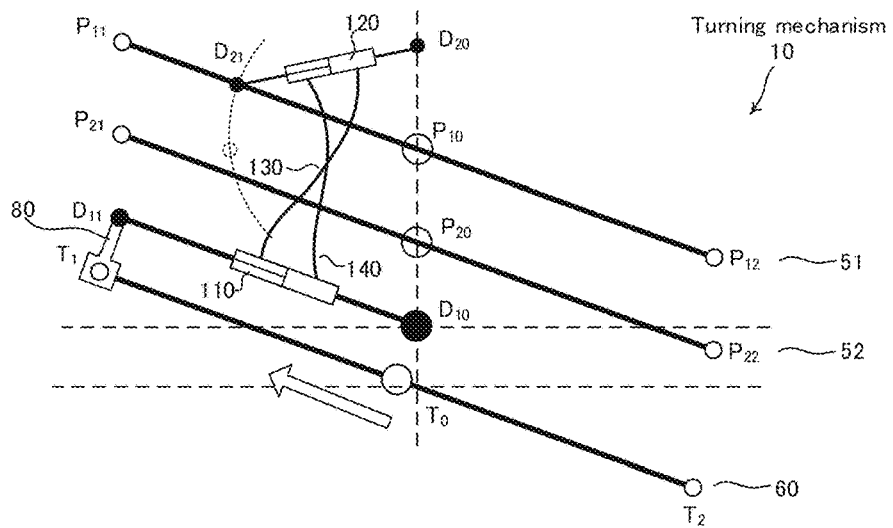
FIG. 20 is a view schematically illustrating the turning mechanism 10 of the vehicle 1 according to the seventh embodiment of the present invention.

The following describes still another embodiment. FIGS. 19A and 19B are views schematically illustrating the turning mechanism 10 of the vehicle 1 according to a seventh embodiment of the present invention. FIG. 20 is a view explaining connection between the first and second dampers 110 and 120 in the turning mechanism 10 of the vehicle 1 according to the seventh embodiment of the present invention.

In the present embodiment, two dampers of the first and second dampers 110 and 120 are provided. The first damper 110 is attached to the tie rod 60 in the illustrated manner. On the other hand, the second damper 120 is attached to, e.g., the horizontal link 51 in the illustrated manner.

Further, in the present embodiment, the first and second dampers 110 and 120 are connected in the manner as depicted in FIG. 15. That is, the first chamber 113 of the first damper 110 and fourth chamber 124 of the second damper 120 are connected through the first circulation tube 130, and the second chamber 114 of the first damper 110 and the third chamber 123 of the second damper 120 are connected through the second circulation tube 140 so as to allow the viscous fluid to be exchanged between the two dampers.

By connecting the two dampers in the manner as described above, characteristics composed of the sum of the characteristics of the first damper 110 and the characteristics of the second damper 120 can be made to act on $T_1$ on the tie rod 60 side to thereby apply a steering torque to the right front wheel 11 and the left front wheel 12, as in the sixth embodiment.

As in the sixth embodiment, when the sum of the characteristics of the first damper 110 and the characteristics of the second damper 120 is as illustrated in FIG. 18, the sum of the characteristics of the two dampers assumes a positive value when the inclination angular velocity of the vehicle body 3 is lower than a predetermined value and assumes a negative value when the inclination angular velocity of the vehicle body 3 is equal to or higher than the predetermined value. That is, the direction of a steering torque to be applied to the right front wheel 11 and the left front wheel 12 can be changed in accordance with the value of the inclination angular velocity of the vehicle body 3.

In the seventh embodiment as well, the sum of the characteristics of the two dampers is used to set such that the right front wheel 11 and the left front wheel 12 are steered so as to turn in the same direction as a travel direction determined by the lean of the vehicle body 3 when the inclination angular velocity of the vehicle body 3 is lower than a predetermined value and steered so as to turn in the direction opposite to a travel direction determined by the lean of the vehicle body 3 when the inclination angular velocity of the vehicle body 3 is equal to or higher than the predetermined value.

With the configuration according to the present embodiment described above, the right front wheel 11 and the left front wheel 12 are steered so as to turn in the same direction as a travel direction (operation direction) determined by the lean of the vehicle body 3 when the inclination angular velocity of the vehicle 1 is low, thereby solving the above (problem 1) that the steered wheels may be delayed in following the lean of the vehicle body 3 to deteriorate turning responsiveness and, at the same time, the right front wheel 11 and the left front wheel 12 are steered so as to turn in the direction opposite to a travel direction (operation direction) determined by the lean of the vehicle body 3 when the inclination angular velocity of the vehicle 1 is high, thereby solving the above (problem 2) that inertial force according to the angular velocity of the inclination angle of the vehicle body 3 acts on the driver to interfere with the driver's driving operation.

In the embodiments described above, the steering torque to be applied to the right front wheel 11 and the left front wheel 12 is adjusted in accordance with the inclination angular velocity (dθ/dt). In addition to such adjustment, an inclination angular acceleration ($d^2θ/dt^2$) may be used to perform adjustment.

Further, although in the embodiments described above, a steering torque in the same direction as the lean direction (operation direction) of the vehicle body 3 is applied to the steered wheels (right front wheel 11, left front wheel 12) when the inclination angular velocity (dθ/dt) is low, and a steering torque in the direction opposite to the lean direction (operation direction) of the vehicle body 3 is applied to the steered wheels (right front wheel 11, left front wheel 12) when the inclination angular velocity (dθ/dt) is high, other control patterns may be adopted in the vehicle according to the present invention.

FIG. 21 is a view explaining the outline of control patterns of the vehicle 1 according to the present invention. The control pattern described in the above embodiments is referred to as pattern (I).

In pattern (I), a steering torque in the "same direction" as the lean direction (operation direction) of the vehicle body 3 is applied to the steered wheels when the inclination angular velocity (dθ/dt) is lower than a predetermined threshold value, and a steering torque in the "opposite direction" relative to the lean direction (operation direction) of the vehicle body 3 is applied to the steered wheels when the inclination angular velocity (dθ/dt) is equal to or higher than the predetermined threshold value.

Application of the steering torque in the "same direction" in pattern (I) is suitable for preventing the steered wheels from being delayed in following the lean of the vehicle body 3 to thereby improve turning response of the vehicle 1. Further, application of the steering torque in the "opposite direction" is suitable for preventing the lean of the vehicle body 3 from interfering with driver's driving operation.

In pattern (II), a steering torque in the "opposite direction" relative to the lean direction (operation direction) of the vehicle body 3 is applied to the steered wheels when the inclination angular velocity (dθ/dt) is lower than a predetermined threshold value, and a steering torque in the "same direction" as the lean direction (operation direction) of the vehicle body 3 is applied to the steered wheels when the inclination angular velocity (dθ/dt) is equal to or higher than the predetermined threshold value.

Application of the steering torque in the "opposite direction" in pattern (II) is suitable for providing a comfortable ride to a driver by preventing lateral G from being applied to the driver's body at the start of movement of the vehicle 1 or immediately before the stop of the vehicle 1. Application of the steering torque in the "same direction" in pattern (II) is suitable for realizing the driver's desired vehicle behavior at the start of movement of the vehicle 1 or immediately before the stop of the vehicle 1.

Pattern (III) and pattern (IV) determine the steering direction of the steered wheels based on the inclination angular acceleration ($d^2θ/dt^2$).

In pattern (III), a steering torque in the "same direction" as the lean direction (operation direction) of the vehicle body 3 is applied to the steered wheels when the inclination angular acceleration ($d^2θ/dt^2$) is lower than a predetermined threshold value, and a steering torque in the "opposite direction" relative to the lean direction (operation direction) of the vehicle body 3 is applied to the steered wheels when the inclination angular acceleration ($d^2θ/dt^2$) is equal to or higher than the predetermined threshold value.

Application of the steering torque in the "same direction" in pattern (III) is suitable for preventing the steered wheels from being delayed in following the lean of the vehicle body 3 to thereby improve turning response of the vehicle 1. Further, application of the steering torque in the "opposite direction" is suitable for preventing the lean of the vehicle body 3 from interfering with the driver's driving operation.

In pattern (IV), a steering torque in the "opposite direction" relative to the lean direction (operation direction) of the vehicle body 3 is applied to the steered wheels when the inclination angular acceleration ($d^2θ/dt^2$) is lower than a predetermined threshold value, and a steering torque in the "same direction" as the lean direction (operation direction) of the vehicle body 3 is applied to the steered wheels when the inclination angular acceleration ($d^2θ/dt^2$) is equal to or higher than the predetermined threshold value.

Application of the steering torque in the "opposite direction" in pattern (IV) is suitable for providing a comfortable ride to a driver by preventing lateral G from being applied to the driver's body at the start of movement of the vehicle 1 or immediately before the stop of the vehicle 1. Application of the steering torque in the "same direction" in pattern (IV) is suitable for realizing the driver's desired vehicle behavior at the start of movement of the vehicle 1 or immediately before the stop of the vehicle 1.

As described above, in the vehicle 1 according to the present invention, by changing the steering torque characteristics (direction, magnitude) of the steered wheels in accordance with the inclination angular velocity (dθ/dt) or inclination angular acceleration ($d^2θ/dt^2$), it is possible to improve traveling characteristics and ride-comfort required of the vehicle 1.

Figure 22:
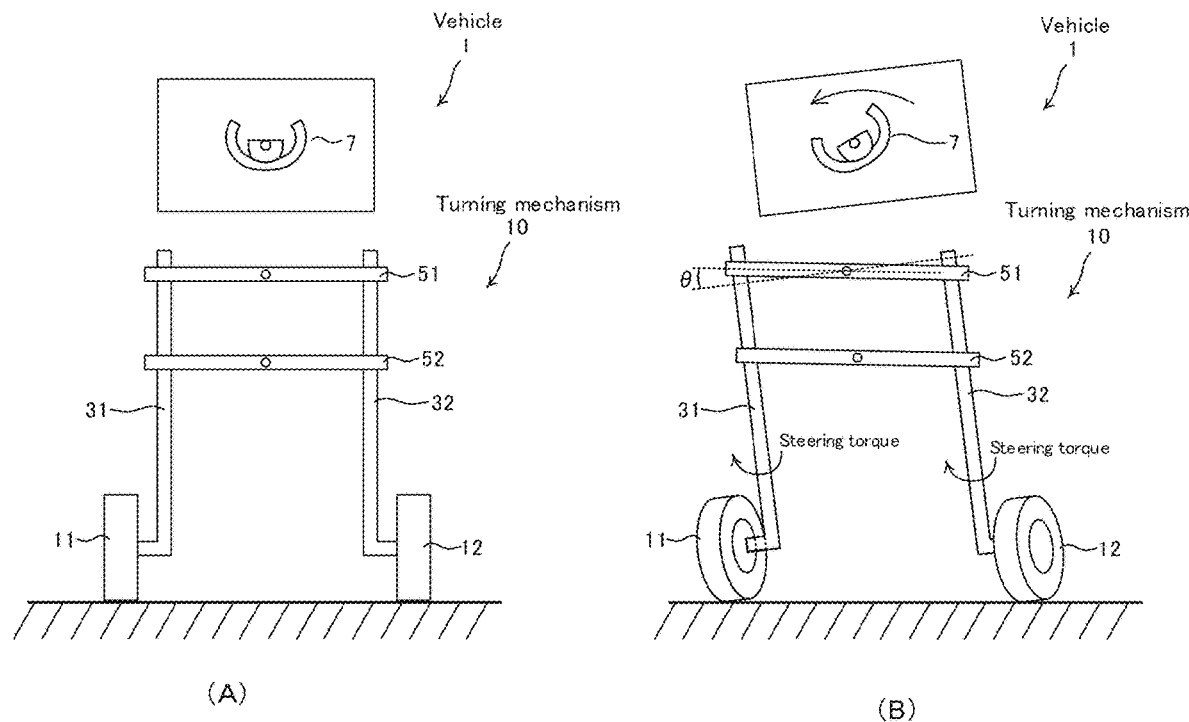
FIGS. 22A and 22B are views each explaining the relationship between a steering wheel 7 as the input member and the turning mechanism 10.

The following describes still another embodiment of the present invention. In the vehicle 1 according to the embodiments described above, a steering torque to be applied to the right front wheel 11 and the left front wheel 12 is mechanically adjusted. Hereinafter, the relationship between the input member and the turning mechanism 10 in the thus configured vehicle 1 will be described. FIGS. 22A and 22B are views each explaining the relationship between a steering wheel 7 as the input member and the turning mechanism 10.

FIGS. 22A and 22B are views schematically illustrating the vehicle 1 as viewed from the front side thereof. In FIGS. 22A and 22B, the turning mechanism 10 and the steering wheel 7 for inputting the direction of the turning mechanism 10 are illustrated from the front side thereof. The steering wheel 7 is intentionally operated by a not-shown driver.

FIG. 22A illustrates a driver's operation intended to go straight ahead and the corresponding state of the turning mechanism 10. On the other hand, FIG. 22B illustrates a state where the driver turns the steering wheel 7 to the right intending to make a right turn and the corresponding state of the turning mechanism 10 (since the FIG. 22B is a front view, the steering wheel 7 is turned left in the drawing). In the vehicle 1 according to the present embodiment, the vehicle body inclines rightward at an inclination angle θ in accordance with the turning angle of the steering wheel 7, and the right front wheel 11 and the left front wheel 12 applied with a steering torque are turned right.

Figure 23:
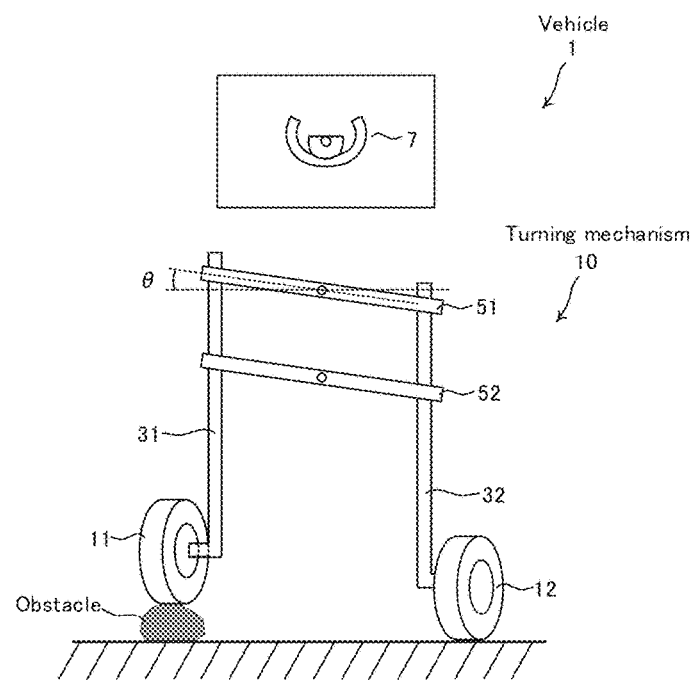
FIG. 23 is a view explaining a problem concerning the vehicle 1 according to the present invention.

Here, a problem in the thus configured vehicle 1 will be described with reference to FIG. 23. FIG. 23 illustrates a state where the right front wheel 11 rides on an obstacle while the driver operates the steering wheel 7 intending to go straight ahead. In such a case, the turning mechanism 10 assumes a posture similar to that when the vehicle 1 turns right, with the result that a steering torque in the "right direction" is unintentionally generated.

Thus, in the embodiment described below, the driver's input from the steering wheel 7 and the operation of the turning mechanism 10 in the vehicle 1 are associated electrically. For example, in the turning mechanism 10, adjustment of a steering torque can also be achieved by an electrical mechanism including a sensor and an actuator.

Figure 24:
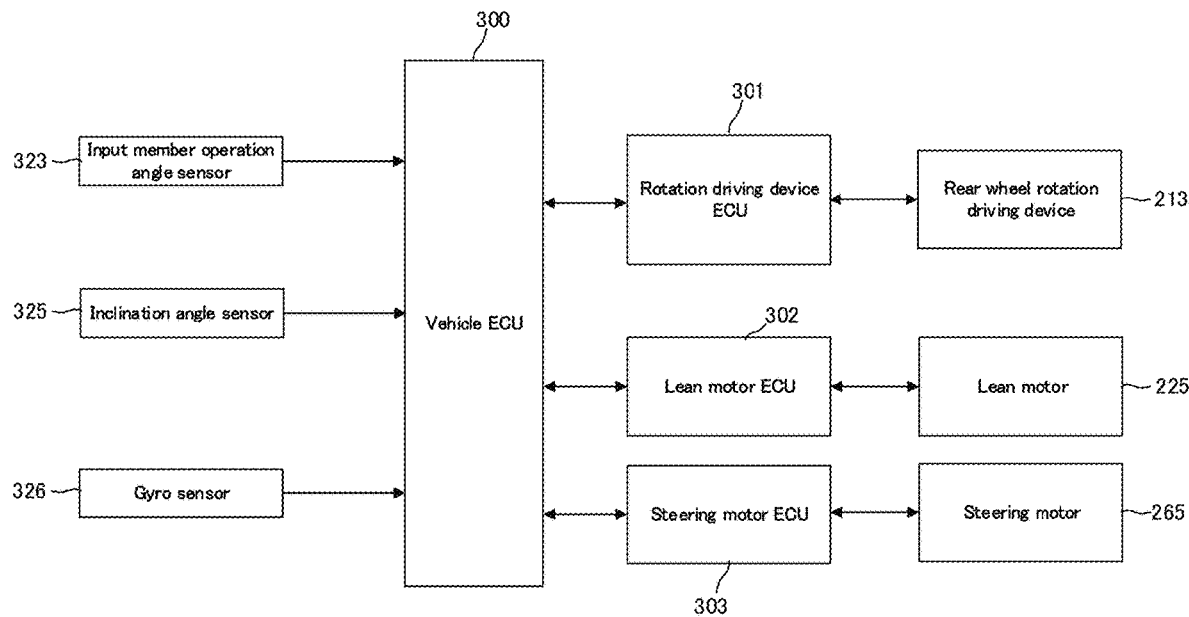
FIG. 24 is a block diagram illustrating a configuration for realizing the electrical control of the vehicle 1 according to the present invention.

FIG. 24 is a block diagram illustrating a configuration for realizing the electrical control of the vehicle 1 according to the present invention. In the block diagram of FIG. 24, configurations not required for the control of the present invention are omitted.

In FIG. 24, a vehicle ECU 300 cooperates with components connected to the illustrated vehicle ECU 100. Various control processing in the vehicle 10 of the present invention are executed based on a program or data stored/held in a storage means such as a ROM in the vehicle ECU 100.

The vehicle 10 according to the present invention includes a rotation driving device ECU 301 that controls a rear wheel rotation driving device 213 based on a command value output from the vehicle ECU 300, a lean motor ECU 302 that controls a lean motor 225 (not illustrated based on a command value output from the vehicle ECU 100, and a steering motor ECU 303 that controls a steering motor 265 based on a command value output from the vehicle ECU 100.

The rear wheel rotation driving device 213 drives the rear wheel 13 into rotation. The lean motor 225 is a motor for setting the inclination angle θ (inclination angle θ of the first horizontal link 51) of the vehicle body as a command value. The steering motor 265 is a motor that applies a steering torque to the steered wheels (right front wheel 11 and left front wheel 12) based on the command value. The steering motor 265 functions as a steering actuator.

The input member such as the steering wheel 7 is a member that a driver operates for turning the vehicle. An input member operation angle sensor 323 detects the turning angle of the input member, and the operation angle data of the steering wheel 7 detected by the input member operation angle sensor 323 is input to the vehicle ECU 100. The input member operation angle sensor 323 is, e.g., an encoder.

The lean motor 225 has an inclination angle sensor 325 that detects a change in the inclination angle θ of the first horizontal link 51. The inclination angle sensor 325 is a rotation angle sensor that detects the rotation angle of the rotary shaft of the lean motor 225 relative to the body thereof and is, e.g., a resolver or an encoder. The inclination angle θ detected by the inclination angle sensor 325 is input to the vehicle ECU 100.

Further, the vehicle body of the vehicle 1 has a gyro sensor 326. Using the gyro sensor 326 allows the vehicle ECU 100 side to grasp at least the direction of gravitational acceleration.

With the above configuration, it is possible to realize electrical control (control of changing the steering torque characteristics (direction; magnitude) of the steered wheels in accordance with the inclination angular velocity or inclination angular acceleration) of the vehicle 1 according to the present invention.

In the embodiment based on such an electrical mechanism, the vehicle ECU 100 determines adjustment operation in the turning mechanism 10 of adjusting a steering torque to be applied to the right front wheel 11 and the left front wheel 12, i.e., control operation of the lean motor 225 and steering motor 265 based on information acquired from the input member operation angle sensor 323, the inclination angle sensor 325 and the gyro sensor 326.

Figure 25:
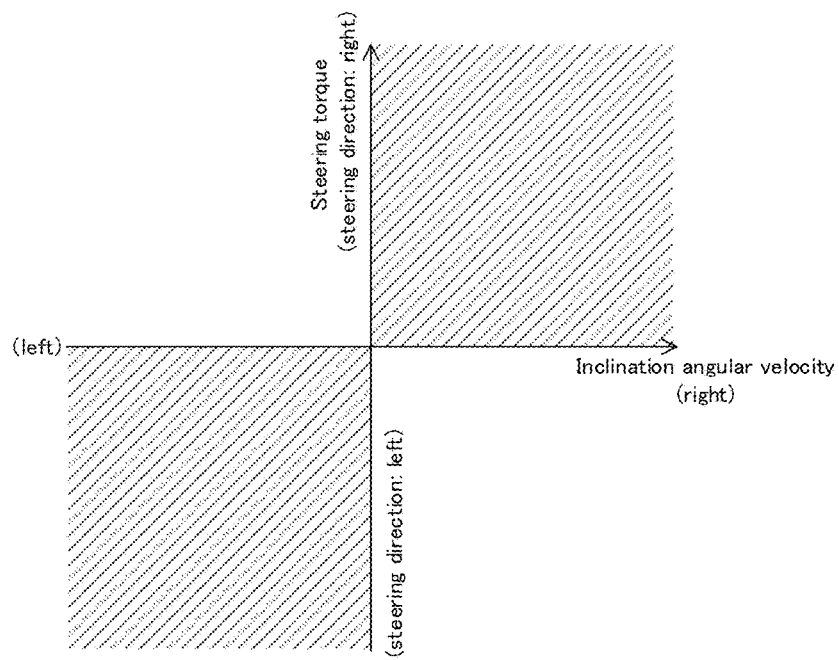
FIG. 25 is a view illustrating the relationship between the direction of the inclination angular velocity and the steering direction of steered wheels.

Particularly, in the vehicle 1 according to the present embodiment, the vehicle ECU 100 determines the steering angle direction of the right front wheel 11 and left front wheel 12 in the steering operation thereof in accordance with a temporal change in the inclination angle θ of the vehicle body, i.e., the direction of the inclination angular velocity (dθ/dt). FIG. 25 is a view illustrating the relationship between the inclination angular velocity (dθ/dt) in the vehicle 1 and the steering direction of the right front wheel 11 and left front wheel 12. In the present embodiment, as illustrated in FIG. 25, in the vehicle ECU 100, the direction of the inclination angular velocity (dθ/dt) and the steering direction of the steered wheels (right front wheel 11 and left front wheel 12) are set in the same direction. That is, as illustrated in FIG. 25, the relationship between the inclination angular velocity (dθ/dt) and the steering torque resides in the first and third quadrants without fail.

Figure 26:
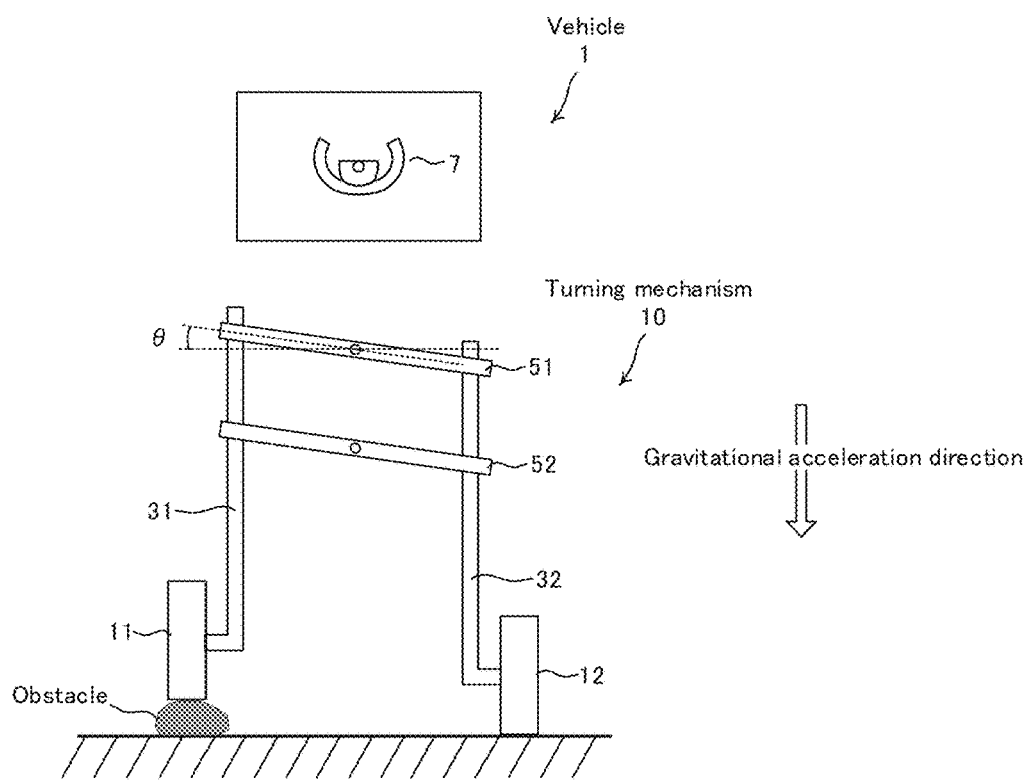
FIG. 26 is a view illustrating the turning mechanism 10 of the vehicle 1 based on electrical control.

In the vehicle 1 having the above electrical mechanism, even when the right front wheel 11 accidentally rides on an obstacle as illustrated in FIG. 26 while the driver operates the steering wheel 7 intending to go straight ahead, the turning mechanism 10 does not assume the right turn posture like FIG. 23, but the posture of the turning mechanism 10 is determined based on a control value from the input member operation angle sensor 323 which is calculated based on the turning angle of the steering wheel 7, so that the above-described inclining motion of the vehicle due to an obstacle is suppressed, whereby the driving state of the vehicle is stabilized.

The vehicle 1 can thus travel stably despite accidental riding on an obstacle when the vehicle 1 is controlled by the electrical mechanism; however, rocking sensation not intended by the driver may occur when the turning mechanism 10 converges to a target inclination angle.

Figure 27:
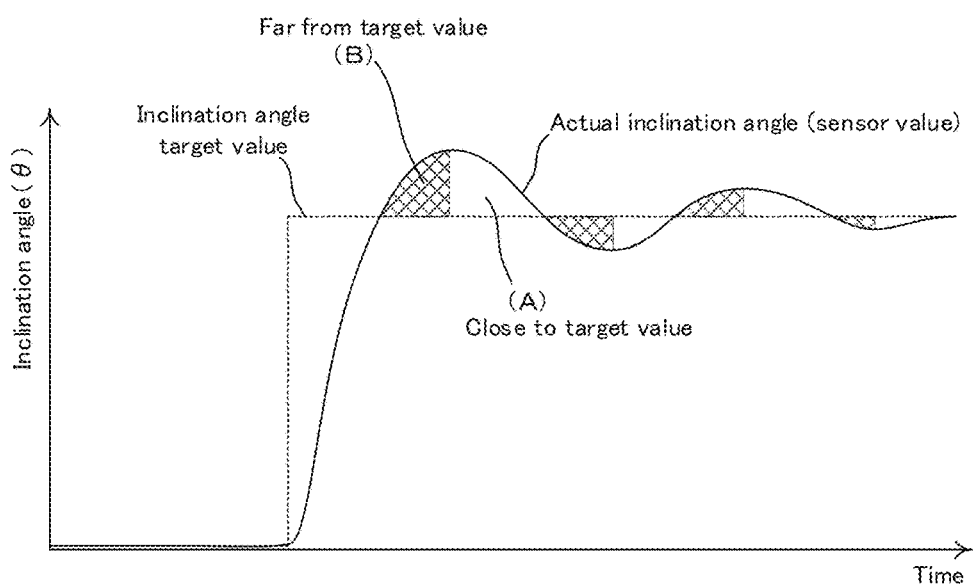
FIG. 27 is a view explaining control based on an inclination angle target value and an actual inclination angle in the turning mechanism 10.

The following describes control for coping with the above problem. FIG. 27 is a view explaining control based on an inclination angle target value and an actual inclination angle in the turning mechanism 10. In FIG. 27, the horizontal axis represents time, and the vertical axis represents inclination angle θ in the turning mechanism 10.

The dashed line denotes a target value of the inclination angle θ corresponding to the turning of the steering wheel 7 by the driver. The continuous line denotes the behavior of an actual inclination angle acquired by the inclination angle sensor 325. In the present embodiment, the vehicle 1 is controlled as follows: a case where the actual inclination angle is far from the target value (area (B) denoted by the hatched portion) and a case where the actual inclination angle is close to the target value (area (A) denoted by the non-hatched portion) are determined, and a steering torque is applied to the right front wheel 11 and the left front wheel 12 when (B) is determined, and no steering torque is applied (or very small steering torque is applied) when (A) is determined.

According to the above embodiment, it is possible to prevent the inclination motion of the vehicle intended by the driver from being impeded and to generate a centrifugal force against external disturbance (riding on a step or crosswind). Thus, it is possible to suppress the inclination motion of the vehicle which is not intended by the driver.

Further, according to the above embodiment, it is possible to cope with a case where the roll (inclination) of the vehicle 10 is made unstable due to occurrence of external disturbance such as a crosswind and to prevent a case where a driver's operational intention is not easily reflected in the inclination motion of the vehicle.

Figure 28:
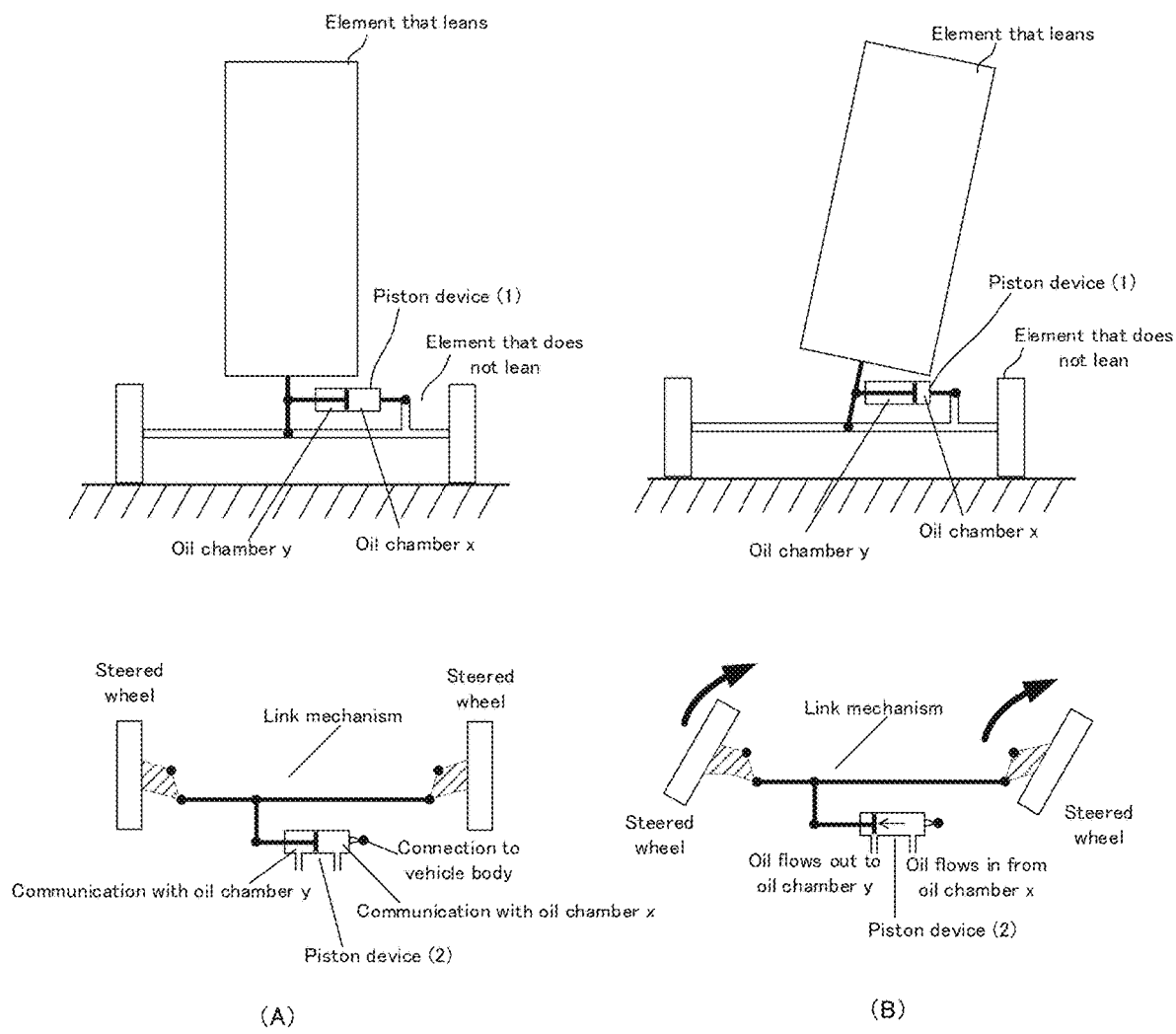
FIGS. 28A and 28B are views schematically illustrating the turning mechanism 10 of the vehicle 1 according to still another embodiment of the present invention.

The following describes still another embodiment of the present invention. FIGS. 28A and 28B are views schematically illustrating the turning mechanism 10 of the vehicle 1 according to the still another embodiment of the present invention.

In the foregoing embodiments based on the mechanical mechanism, the elastic member that expands/contracts in accordance with the inclination directly applies a steering torque to the steered wheels. On the other hand, the turning mechanism 10 of the vehicle 1 according to the present invention differs from the foregoing embodiments in that it has two elastic members of a first elastic member (piston device (1)) that expands/contracts in accordance with the inclination and a second elastic member (piston device (2)) that operates in conjunction with the first elastic member to apply a steering torque to the steered wheels.

In FIGS. 28A and 28B, the components are divided into elements that lean and elements that do not lean. The turning mechanism 10 has the piston device (1) that receives force from the leaning elements, such as the vehicle body 3 and piston device (2) that transmits force to the link mechanism connected to the steered wheels. Each of the the piston devices has oil chambers, and the oil chambers are connected as illustrated. FIG. 28A illustrates the vehicle 1 that goes straight ahead, and FIG. 28B illustrates the vehicle that turns right. As illustrated in FIG. 28B, when the vehicle body is inclined, an oil chamber x of the piston device (1) is compressed, and the compressed oil flows in a cylinder (right side oil chamber in the drawing) of the piston device (2). As a result, the piston of the piston device (2) is moved to the left, with the result that the steered wheels are steered by the link mechanism linked to the piston.

The piston devices (1) and (2) can be regarded to have the same function as the elastic member such as a damper.

As described above, the vehicle according to the present invention has the torque applying part that applies a steering torque to the steered wheels in accordance with the inclination angular velocity or inclination angular acceleration of the vehicle body. According to the thus configured vehicle of the present invention, it is possible to solve one or both of the problems that the steered wheels may be delayed in following the lean of the vehicle body to deteriorate turning responsiveness and that inertial force according to the angular velocity of the inclination angle of the vehicle body acts on the driver to interfere with the driver's driving operation.

In the embodiment based on the electrical mechanism, the direction of the inclination angular velocity ($d\theta/dt$) and the steering direction of the steered wheels (right front wheel 11 and left front wheel 12) are set in the same direction; however, for example, a steering torque can be applied in the direction opposite to the direction of the inclination angular velocity in the above-described case of (A) in FIG. 27.

INDUSTRIAL APPLICABILITY

The present invention relates to a small-sized vehicle having been recently attracting attention from the viewpoint of energy savings. Conventionally, such a vehicle has the following problems. That is, the vehicle is configured to turn in a mode in which the vehicle body is leaned, and the steering angle of the steered wheels changes following the lean of the vehicle body. In this case, however, the steering angle of the steered wheels may be delayed in following the lean of the vehicle body, resulting in deterioration in turning responsiveness. In addition, when the lean speed of the vehicle body is very high, inertial force according to the angular velocity of the inclination angle of the vehicle body acts on the driver, which may interfere with the driver's driving operation.

On the other hand, the vehicle according to the present invention has the torque applying part that applies a steering torque to the steered wheels in accordance with the inclination angular velocity or inclination angular acceleration of the vehicle body. According to the thus configured vehicle of the present invention, it is possible to solve one or both of the problems that the steered wheels may be delayed in following the lean of the vehicle body to deteriorate turning responsiveness and that inertial force according to the angular velocity of the inclination angle of the vehicle body acts on the driver to interfere with the driver's driving operation. Therefore, the present invention has great industrial applicability.

REFERENCE SIGNS LIST

1: Vehicle
3: Vehicle body
5: Seat
7: Steering wheel
10: Turning mechanism
11: Right front wheel
12: Left front wheel
13: Rear wheel
15: Center pole
17: Center pole extending part
21: Right suspension pole
22: Left suspension pole
25: Center tube
31: Right suspension arm
32: Left suspension arm
41: Right front wheel axle
42: Left front wheel axle
51: First horizontal link
52: Second horizontal link
60: Tie rod
70: Damper
71: Cylinder
72: Cylinder side attachment part
75: Piston rod
76: Piston rod side attachment part
80: Damper link
110: First damper
111: Cylinder
113: First chamber
114: Second chamber
115: Piston rod
118: Piston
120: Second damper
121: Cylinder
123: Third chamber
124: Fourth chamber
125: Piston rod
128: Piston
130: First circulation tube
140: Second circulation tube
213: Rear wheel rotation driving device
225: Lean motor
265: Steering motor
300: Vehicle ECU
301: Rotation driving device ECU
302: Lean motor ECU
303: Steering motor ECU
323: Input member operation angle sensor
325: Inclination angle sensor
326: Gyro sensor

The invention claimed is:

1. A vehicle comprising:
a vehicle body provided with three or more wheels, including a pair of steered wheels that are spaced apart from each other in the width direction
an input member that inputs a turning direction and a steering member that steers the steered wheels,
an inclination angle detection part that detects an inclination angle of the vehicle body about a roll axis thereof; and
a torque applying part that applies a steering torque to the steered wheel wheels in accordance with an inclination angular velocity or an inclination angular acceleration of the vehicle body calculated from the inclination angle, wherein
the torque applying part adjusts a steering angle direction of the steered wheels and/or a steering operation speed in accordance with the inclination angular velocity of the vehicle body,
the torque applying part applies a steering torque in a same direction as the direction of the inclination angular velocity of the vehicle body,
the input member and the steering member are mechanically completely separated from each other.

2. The vehicle according to claim 1, wherein
the torque applying part applies a steering torque in the same direction as the direction of the inclination angular velocity when the inclination angular velocity of the vehicle body is lower than a predetermined value and applies a steering torque in the direction opposite to the direction of the inclination angular velocity when the inclination angular velocity of the vehicle body is equal to or higher than the predetermined value.

3. The vehicle according to claim 1, wherein
the torque applying part includes an elastic member that expands/contracts in accordance with inclination of the vehicle body.

4. The vehicle according to claim 3, wherein
the inclination angle detection part is a first elastic member that expands/contracts in accordance with the inclination angle of the vehicle body, and
the torque applying part has a second elastic member that operates in conjunction with the first elastic member to apply a steering torque to the steered wheels.

5. The vehicle according to claim 4, wherein
the first and second elastic members are a same member.

6. The vehicle according to claim 1, comprising:
a pair of suspension poles that house a pair of suspension arms that suspend a-the pair of steered wheels;
a pair of horizontal links that form a parallel link together with the pair of suspension poles; and
a tie rod that equalizes the steering angles of the pair of steered wheels, wherein
the torque applying part includes a damper having one end connected to the tie rod through a damper link and the other end connected to the vehicle body.

7. The vehicle according to claim 1, comprising:
a pair of suspension poles that house a pair of suspension arms that suspend a-the pair of steered wheels;
a pair of horizontal links that form a parallel link together with the pair of suspension poles; and
a tie rod that equalizes the steering angles of the pair of steered wheels, wherein
the torque applying part includes:
a first damper having one end connected to the tie rod through a damper link and the other end connected to the vehicle body;
a second damper having one end connected to at least one of the pair of horizontal links and the other end connected to the vehicle body; and
a pair of circulation tubes that circulate fluid in the first damper and fluid in the second damper.

8. The vehicle according to claim 7, wherein
characteristics of a resistance generated in accordance with a piston moving speed of the first damper and characteristics of a resistance generated in accordance with a piston moving speed of the second damper differ from each other.

9. The vehicle according to claim 1, wherein
an input member that inputs a turning direction and a steering member that steers the steered wheels are mechanically semi-connected.

10. The vehicle according to claim 1, comprising a control part that issues a control command to the torque applying part, wherein
the control part issues a control command to the torque applying part so as to adjust a steering angle direction of the steered wheels and/or a steering operation speed in accordance with the inclination angular velocity of the vehicle body.

11. The vehicle according to claim 10, wherein
the torque applying part performs the adjustment when an actual inclination angle is far from a target inclination angle and does not perform the adjustment or reduce the adjustment when the actual inclination angle is close to the target inclination angle.

* * * * *